United States Patent [19]
Baker et al.

[11] Patent Number: 6,011,192
[45] Date of Patent: Jan. 4, 2000

[54] MEMBRANE-BASED CONDITIONING FOR ADSORPTION SYSTEM FEED GASES

[75] Inventors: Richard W. Baker, Palo Alto; Kaaeid A. Lokhandwala, Union City, both of Calif.

[73] Assignee: Membrane Technology and Research, Inc., Menlo Park, Calif.

[21] Appl. No.: 09/083,560

[22] Filed: May 22, 1998

[51] Int. Cl.[7] .............................. C07C 7/00; C07C 7/144
[52] U.S. Cl. .................. 585/818; 585/802; 585/803; 585/820; 585/822
[58] Field of Search .................................. 585/802, 809, 585/818, 819, 820, 822, 803

[56] References Cited

U.S. PATENT DOCUMENTS

| | | |
|---|---|---|
| 366,081 | 7/1887 | Edgerton . |
| 1,174,631 | 3/1916 | Snelling . |
| 3,567,632 | 3/1971 | Richter et al. ............................. 210/23 |
| 4,229,188 | 10/1980 | Intille ......................................... 55/16 |
| 4,230,463 | 10/1980 | Henis et al. ................................ 55/16 |
| 4,238,204 | 12/1980 | Perry .......................................... 55/16 |
| 4,362,613 | 12/1982 | MacLean ................................ 208/108 |
| 4,367,135 | 1/1983 | Posey, Jr. ................................ 208/108 |
| 4,548,619 | 10/1985 | Steacy ......................................... 55/16 |
| 4,654,063 | 3/1987 | Auvil et al. ................................ 62/18 |
| 4,690,695 | 9/1987 | Doshi ......................................... 55/16 |
| 4,701,187 | 10/1987 | Choe et al. .................................. 55/16 |
| 4,783,203 | 11/1988 | Doshi ......................................... 55/16 |
| 4,836,833 | 6/1989 | Nicholas et al. ............................ 55/16 |
| 4,857,078 | 8/1989 | Watler ......................................... 55/16 |
| 4,857,080 | 8/1989 | Baker et al. ................................. 55/16 |
| 4,863,492 | 9/1989 | Doshi et al. ................................. 55/16 |
| 4,892,564 | 1/1990 | Cooley ........................................ 55/16 |
| 4,963,165 | 10/1990 | Blume et al. ................................ 55/16 |
| 5,032,148 | 7/1991 | Baker et al. ................................. 55/16 |
| 5,053,067 | 10/1991 | Chretien ..................................... 62/24 |
| 5,082,481 | 1/1992 | Barchas et al. ............................. 62/23 |
| 5,089,033 | 2/1992 | Wijmans ..................................... 55/16 |
| 5,104,425 | 4/1992 | Rao et al. .................................... 55/16 |
| 5,157,200 | 10/1992 | Mikkinen et al. ...................... 585/803 |
| 5,199,962 | 4/1993 | Wijmans ..................................... 55/16 |
| 5,281,255 | 1/1994 | Toy et al. ..................................... 95/50 |
| 5,332,424 | 7/1994 | Rao et al. .................................... 95/47 |
| 5,332,492 | 7/1994 | Maurer et al. ........................... 208/340 |
| 5,354,547 | 10/1994 | Rao et al. .................................. 423/650 |
| 5,374,300 | 12/1994 | Kaschemekat et al. .................... 95/39 |
| 5,407,466 | 4/1995 | Lokhandwala et al. ..................... 95/49 |
| 5,407,467 | 4/1995 | Lokhandwala et al. ..................... 95/49 |
| 5,435,836 | 7/1995 | Anand et al. ................................ 95/49 |
| 5,452,581 | 9/1995 | Dinh et al. .................................. 62/24 |
| 5,457,256 | 10/1995 | Mitariten et al. ........................ 585/655 |
| 5,501,722 | 3/1996 | Toy et al. ..................................... 95/50 |
| 5,507,856 | 4/1996 | Rao et al. ..................................... 95/50 |
| 5,634,354 | 6/1997 | Howard et al. ............................ 62/624 |
| 5,675,052 | 10/1997 | Menon et al. ........................... 585/717 |
| 5,755,855 | 5/1998 | Baker et al. ................................. 95/39 |
| 5,785,739 | 7/1998 | Baker .......................................... 95/39 |

OTHER PUBLICATIONS

W.A. Bollinger et al., "Prism™ Separators Optimize Hydrocracker Hydrogen," presented at AlChE 1983 Summer National Meeting, Session No. 66, Aug. 29, 1983.

W.A. Bollinger et al., "Optimizing Hydrocracker Hydrogen," Hydrocarbon Processing, Feb. 1995.

J.M. Abrardo et al., "Hydrogen Technologies to Meet Refiners' Future Needs," Hydrocarbon Processing, Feb. 1995.

H. Yamashiro et al., "Hydrogen Purification with Cellulose Acetate Membranes," presented at Europe–Japan Congress on Membranes and Membrane Processes, Jun. 18–21, 1984.

(List continued on next page.)

*Primary Examiner*—Walter D. Griffin
*Assistant Examiner*—Tam M. Nguyen
*Attorney, Agent, or Firm*—J. Farrant

[57] ABSTRACT

A process for treating gas streams containing hydrogen and hydrocarbons. The process includes a membrane conditioning step to remove $C_5$–$C_8$ hydrocarbons, followed by a selective adsorption or membrane separation step to separate hydrogen from methane. The membrane conditioning step uses a membrane selective for $C_5$–$C_8$ hydrocarbons over hydrogen.

45 Claims, 5 Drawing Sheets

OTHER PUBLICATIONS

H. Yamashiro et al., "Plant Uses Membrane Separation," Hydrocarbon Processing, Feb. 1985.

"Polymeric Gas Separation Membranes," Paul and Yampolski (eds.). (no date available).

"Membrane Technology for Hydrocarbon Separation," Membrane Associates Ltd. (no date available).

E.W. Funk et al., "Effect of Impurities on Cellulose Acetate Membrane Performance," AIChE Symposium Series, No. 250, vol. 82. (no date available).

N.N. Li, et al. "Membrane Separation Processes in the Petrochemical Industry," Report by Allied–Signal Engineered Materials Research Center to DOE, Sep. 30, 1997.

M. Anand et al., "Novel Selective Surface Flow (SSF™) Membranes for the Recovery of Hydrogen from Waste Gas Streams," Report by Air Products to DOE, Apr. 1996.

T. Naheri et al., "Scale–Up of Selective Surface Flow Membrane for Gas Separation," by Air Products and Chemicals, Inc. (No date available).

M. Anand "Novel Selective Surface Flow (SSF™) Membranes for the Recovery of Hydrogen from Waste Gas Streams," by Air Products Inc., Report to DOE, Aug. 1995.

M. Rao et al., "Practical Application of SSF™ Membrane," Journal of Membrane Science 85 253–264, 1993.

M. Rao et al., "Nanoporous Carbon Membrane for Gas Separation," Gas Separation and Purification, vol. 7, No. 4, 1993.

MEMBRANE-BASED CONDITIONING FOR ADSORPTION SYSTEM FEED GASES

FIELD OF THE INVENTION

The invention relates to treatment of gas streams containing hydrogen and hydrocarbons. Specifically, the invention relates to using a gas-separation membrane to condition gas destined for separation by pressure swing adsorption (PSA) or the like.

BACKGROUND OF THE INVENTION

A number of off-gas streams containing hydrogen and hydrocarbons are generated during refinery and petrochemical plant operations. These streams include overheads from: phase separators; fractionation columns; stabilization columns; demethanizers; debutanizers; absorption, stripping and scrubbing units; and so on. In some cases, the composition of the stream renders it suitable for reintroduction into the train of operations upstream or downstream of its generation point. Frequently, however, the stream composition is such that it is not cost-effective to treat it further and it is passed to the plant fuel header.

Streams passed to the fuel header typically contain a mixture of light hydrocarbons, heavier hydrocarbons and hydrogen. The heavier hydrocarbons represent lost product, or at least may have a higher value as LPG than as fuel gas. Most refineries currently operate with a hydrogen deficit, which would be reduced if more hydrogen could be recovered from ongoing operations. In addition, only a finite quantity of fuel gas is needed, so some plants are bottlenecked by over supply. In these bottleneck situations, reduction in the amount of fuel gas produced, and/or control of the Btu value of that gas by reducing the heavier hydrocarbon content, would enable throughput of the unit operations in the refinery train, such as hydrotreating or reforming, to be increased.

Techniques exist that, in principle, can remove hydrocarbons and hydrogen to essentially any desired degree. For example, $C_{4+}$ and heavier hydrocarbons can be removed from the stream by cooling, compression, or a combination of both. Cooling is indeed often used, such as to treat the hot vapors that form the raw reactor effluent from hydroprocessing, aromatics manufacture and the like. Streams can be cooled by heat exchange against incoming fluids, by air cooling, water cooling or use of external refrigerants. Practical limits are set by availability and cost of coolants, however, and the lower the temperature, the harder the economic justification becomes. Absorption into lean oils can be used, but again, performance is limited by the pressure and temperature conditions under which the process is carried out, which in turn are controlled by cost factors.

For hydrogen recovery from light hydrocarbons, techniques that have been deployed in refineries and petrochemical plants include pressure swing adsorption (PSA) and membrane separation. Representative references that teach the use of PSA to treat off-gases from petrochemical processes include U.S. Pat. Nos. 5,332,492 and 5,457,256, to UOP, and U.S. Pat. No. 5,675,052, to BOC. The literature also contains numerous references to membrane separation processes for hydrogen/hydrocarbon separation in refineries. For example, U.S. Pat. Nos. 4,362,613 and 4,367,135, to Monsanto, describe processes for treating overhead vapors from phase separators in a hydrocracking plant. U.S. Pat. No. 4,548,619, to UOP, shows membrane treatment of the overhead gas from an absorber treating effluent from benzene production. U.S. Pat. No. 5,053,067, to L'Air Liquide, discloses removal of part of the hydrogen from a refinery off-gas to facilitate downstream treatment. U.S. Pat. No. 5,082,481, to Lummus Crest, describes use of a membrane for removal of hydrogen from cracking effluent. U.S. Pat. No. 5,157,200, to Institute Francais du Petrole, shows treatment of light ends containing hydrogen and light hydrocarbons. Other references that describe membrane-based separation of hydrogen from gas streams in a general way include U.S. Pat. Nos. 4,654,063, to Air Products, and 4,892,564, to Cooley.

The use of polymeric membranes to treat off-gas streams in refineries is also described in the following papers: "Hydrogen Purification with Cellulose Acetate Membranes", by H. Yamashiro et al., presented at the Europe-Japan Congress on Membranes and Membrane Processes, June 1984; "Prism™ Separators Optimize Hydrocracker Hydrogen", by W. A. Bollinger et al., presented at the AIChE 1983 Summer National Meeting, August 1983; "Plant Uses Membrane Separation", by H. Yamashiro et al., in Hydrocarbon Processing, February 1985; and "Optimizing Hydrocracker Hydrogen", by W. A. Bollinger et al., in Chemical Engineering Progress, May 1984. These papers describe system designs using cellulose acetate or similar membranes that permeate hydrogen and reject hydrocarbons. The use of membranes in refinery separations is also mentioned in "Hydrogen Technologies to Meet Refiners° Future Needs", by J. M. Abrardo et al. in Hydrocarbon Processing, February 1995. A chapter in "Polymeric Gas Separation Membranes", D. R. Paul et al. (Eds.) entitled "Commercial and Practical Aspects of Gas Separation Membranes", by Jay Henis describes various membrane-based hydrogen separations.

In all of the above cases, the membranes used to perform the hydrogen/hydrocarbon separation are hydrogen-selective, that is, they permeate hydrogen preferentially over hydrocarbons and all other gases in the mix.

A difficulty that hampers the use of both PSA systems and membrane separation systems of the type described above is the presence in off-gases of the heavier hydrocarbons, water vapor and hydrogen sulfide. These materials cause a variety of problems. In the case of PSA systems, they may sorb preferentially onto the bed, both reducing the capacity of the beds to sorb the light hydrocarbons that they are intended to remove, and giving rise to serious regeneration difficulties, as discussed below.

In the case of membrane systems, the presence of these materials can cause catastrophic collapse of the membranes. For example, a report by N. N. Li et al. to the Department of Energy ("Membrane Separation Processes in the Petrochemical Industry", Phase II Final Report, September 1987) presents data showing the effect of water vapor on membrane flux for cellulose acetate membranes, and concludes that "for relative humidities of 30% and higher, the flux decline is large, rapid, and irreversible". E. W. Funk et al. ("Effect of Impurities on Cellulose Acetate Membrane Performance", Recent Advances in Separation Techniques—III, AIChE Symposium Series, 250, Vol 82, 1986) advocate that "Moisture levels up to 20% RH appear tolerable but higher levels can cause irreversible membrane compaction". Similar or worse problems can occur if liquid hydrocarbons are allowed to come into contact with membranes surfaces, as well as glues or other components used in the membrane modules. Although the feed gas to the inlet of the membrane separation system may be comfortably above its dewpoint, as the gas travels along the modules and is depleted in the faster permeating hydrogen, the hydrocarbon content of the residue can quickly build up, raising the dewpoint temperature sufficiently for hydrocarbon condensation in the modules to take place. To avoid this, either the gas must be heated at least 10° C. above the highest dewpoint temperature that will be reached, or the more condensable hydrocarbons must be removed to a low level before the gas enters the membrane system.

To deal with these issues, both for PSA and membrane systems, pretreatment of hydrogen/light hydrocarbon mixtures must almost always be carried out, so that the PSA system or the membrane system is adequately protected and sees only a clean hydrogen/light hydrocarbon stream. A number of references show combinations of PSA with upstream treatment. For example, U.S. Pat. No. 5,675,052, to BOC, teaches treatment of off-gases from an alkylation process, in which the raw alkylate is compressed and cooled to condense almost all of the hydrocarbons in the stream, and the remaining hydrogen/light hydrocarbon mix is sent for PSA treatment. U.S. Pat. No. 5,457,256, to UOP, concerns treatment of dehydrogenation gases. The gases are first dehydrated to lower the water content to below 5 ppm. This highlights yet another difficulty, in that, if cooling below 0° C. is used to remove hydrocarbons, the stream thus treated must first be dried to avoid ice formation in the subsequent hydrocarbon condensation step. After the gas has been dried, a cold box is used to reduce the gas temperature to between −29° C. and −117° C. The resulting uncondensed hydrogen/methane stream is finally sent for PSA treatment. A very similar scheme is described in U.S. Pat. No. 5,332,492, to UOP. In this case, the raw gas stream to be treated is typically from a catalytic reforming process. The process employs a PSA step preceded by a simple precooling step. Nevertheless, the simple precooling step requires the gas to be refrigerated between −9° C. and −26° C. The patent mentions that drying, such as with a glycol dessicant, must be used before the refrigeration step if the gas contains water vapor.

A reference that shows condensation to remove hydrocarbons upstream of a membrane separation step in a refinery is U.S. Pat. No. 5,452,581, to Dinh et al. Effluent from an ethylene manufacturing operation is cooled to a temperature below 0° C., such as −30° C. to −50° C., before passing the remaining stream to a hydrogen-selective membrane. Interestingly, in this case, the membrane is specifically used to raise the dewpoint of the remaining stream to facilitate subsequent cryogenic condensation.

Besides individual treatment by PSA or membranes, numerous processes are known in which membrane separation (using conventional glassy, hydrogen-selective membranes) and PSA are combined in a complementary way to carry out an integrated process. These include the following U.S. Pat. No. 4,229,188, in which a guard absorber removes heavier hydrocarbons prior to a PSA/membrane hybrid separation; U.S. Pat. No. 4,238,204, in which the PSA unit precedes the membrane unit; U.S. Pat. No. 4,690,695, in which the membrane unit precedes the PSA unit; U.S. Pat. No. 4,701,187, in which a two-stage membrane unit is used in conjunction with a PSA unit; U.S. Pat. No. 4,783,203, in which the reject gas from the membrane separation step is used as displacement gas in the upstream PSA regeneration step; U.S. Pat. No. 4,836,833, in which PSA and membranes are used in either order to treat steam reformer off-gases after carbon dioxide removal; and U.S. Pat. No. 4,863,492, in which reject gases from a membrane separation step followed by a PSA step are combined to make a blended product. These numerous references all have two features in common. First, the membrane unit and the PSA unit are used in a complementary way to perform the same separation. Secondly, insofar as they relate to hydrogen/hydrocarbon separations, the membrane units all use hydrogen-selective membranes.

It is possible, however, to carry out separations in which hydrocarbons permeate selectively and hydrogen is rejected in the residue stream. Processes that rely on selective permeation of hydrocarbons to separate at least some hydrocarbons from at least some other less condensable gases are taught, for example, in U.S. Pat. Nos. 4,857,078; 4,963,165; 5,032,148; 5,089,033; 5,199,962, 5,281,255; 5,401,300; 5,407,466; 5,407,467; and 5,501,722, all to Membrane Technology and Research (MTR). In particular, U.S. Pat. No. 4,857,078, to Watler/MTR, mentions that, in natural gas liquids recovery, streams that are enriched in hydrogen can be produced as retentate by a rubbery membrane.

Literature from Membrane Associates Ltd., of Reading, England, shows and describes a design for pooling and downstream treating various refinery off-gases, including passing of the membrane permeate stream to subsequent treatment for LPG recovery.

An alternative approach using membranes that reject hydrogen and preferentially permeate hydrocarbons is to use not a polymeric membrane but a carbon membrane, such as those taught in U.S. Pat. No. 5,104,425, to Air Products and Chemicals. These membranes are made up of a microporous adsorbent material on a porous substrate, and can separate gas mixtures based on selective adsorption onto the pore walls, rather than by the solution/diffusion mechanism of conventional polymeric membranes. Thus, the mechanism of separation is akin to the separation mechanism in PSA. This allows separation between various hydrocarbon fractions to be made, and hydrogen tends to be retained in the membrane residue stream.

It is known to combine these membranes with PSA to carry out integrated separations of light hydrocarbons from hydrogen. U.S. Pat. No. 5,332,424 describes fractionation of a gas stream containing $C_1$–$C_4$ hydrocarbons and hydrogen using a bank of membrane modules followed by a PSA unit. U.S. Pat. No. 5,354,547 teaches adsorbent carbon membranes followed by PSA for treating steam reformer off-gases. U.S. Pat. No. 5,435,836 teaches PSA followed by adsorbent carbon membranes for a similar separation, and U.S. Pat. No. 5,507,856 teaches a carbon membrane/PSA design for hydrocarbon/hydrogen separations in general, including sweeping of the permeate side of the membrane with reject gas from the PSA step. U.S. Pat. No. 5,634,354 teaches combinations of adsorbent membranes and PSA to treat gases containing hydrogen and olefins.

Adsorbent membranes systems similar to those disclosed in the above patents are described in papers by M. B Rao and S. Sirkar in Journal of Membrane Science (Vol. 85, 253–264 (1993)) and Gas Separation and Purification (Vol. 7, No. 4, 279–284 (1993)). Adsorbent membrane/PSA hybrid systems are described in some detail in reports by M. Anand and K. A. Ludwig to the U.S. Department of Energy ("Novel Selective Surface Flow Membranes for the Recovery of Hydrogen from Waste Gas Streams", Phase I (1995) and Phase II (1996) Final Reports under contract number DE-FC04-93AL94461), and in materials distributed at a U.S. Department of Energy, Office of Industrial Technology, exhibit in Washington, D.C. ("Scale-Up of Selective Surface Flow Membrane for Gas Separation", T. Nahieri et al., Air Products and Chemicals, 1996).

In all of the above references, the gas mixtures introduced into the adsorbent carbon membrane system are limited to those containing no heavier than $C_4$ hydrocarbons. In fact, the references are explicit that a pretreatment system (temperature swing adsorption) is used to remove $C_{5+}$ hydrocarbons, water vapor and hydrogen sulfide that might foul the membranes. Since the membranes rely on adsorption for their separation properties, they are vulnerable to the same problems as PSA systems, namely that the more readily is a component sorbed, the more difficult is it to desorb. These contaminants, once introduced into the membranes, block the sorption sites and prevent the membranes functioning for their intended purpose.

SUMMARY OF THE INVENTION

The invention is a process for treating a multicomponent gas mixture containing at least hydrogen, methane and a $C_5$–$C_8$ hydrocarbon, the gas being characterized by a dewpoint at 200 psia of at least about 10° C. The process can be applied to any such gas mixture, and is particularly useful in treating off-gases from hydrotreaters, reformers, catalytic crackers, cokers and other refinery or petrochemical plant equipment. The process includes two main steps: a conditioning step to lower the dewpoint by at least 10° C., specifically by removing $C_5$–$C_8$ hydrocarbons, and a selective adsorption step to separate the hydrogen from methane and any other remaining hydrocarbon components. In its most basic aspect, the process of the invention comprises the following conditioning step:

(i) passing the gas as a feed stream across the feed side of a polymeric membrane having a feed side and permeate side, and being selective for hydrocarbons over hydrogen;

(ii) withdrawing from the permeate side a permeate stream enriched in $C_5$–$C_8$ hydrocarbon compared with the gas;

(iii) withdrawing from the feed side a conditioned residue stream comprising hydrogen and methane and having a dewpoint at 200 psia at least about 10° C. lower than the original dewpoint; and the following separation step:

(i) passing the conditioned residue gas to a selective adsorption system, thereby selectively adsorbing methane from the gas;

(ii) withdrawing a purified hydrogen product stream from the adsorption system;

(iii) desorbing and withdrawing a waste gas stream from the adsorption system.

In another aspect, the invention is the combination of a membrane separation unit capable of selectively removing $C_5$–$C_8$ hydrocarbons and an adsorption unit capable of selectively removing methane from hydrogen.

The membrane separation step conditions the gas by lowering the dewpoint by at least about 10° C., and preferably by much more, such as 20° C., 30° C. or more, before the gas passes to the adsorption step. The invention differs from the other numerous combinations of membrane separation with selective adsorption of which applicants are aware in two regards. First, the membrane separation step and the selective adsorption step are not performing the same separation. The membrane separation step is used to separate $C_5$–$C_8$ hydrocarbons from hydrogen and methane; the selective adsorption step is used to separate hydrogen from methane and any other remaining hydrocarbons.

In this way, the membrane protects the adsorption system from exposure to the heavier hydrocarbons. As was discussed above, if $C_5$–$C_8$ hydrocarbons, or even heavier hydrocarbons, reach the adsorbent system, they sorb very readily onto the beds. Bed regeneration is typically carried out by lowering the pressure on the bed, thereby desorbing the previously sorbed materials and flushing them out of the bed. Since $C_5$–$C_8$ hydrocarbon components are liquid at room temperature and pressure, they are difficult to desorb, and tend to remain in the bed, causing progressive fouling. To remove such contaminants, it may even be necessary to draw a vacuum on the bed, which increases the cost and complexity of operation substantially. These problems are avoided completely by the membrane conditioning step.

The second aspect in which the process of the invention differs from other combinations of membrane separation with selective adsorption is that pretreatment steps before the membrane separation step, for example to remove hydrocarbons or acid gases, although optional, are not necessary. The preferred membranes used in the present invention permeate hydrocarbons, hydrogen sulfide and water vapor preferentially over hydrogen, and are capable of withstanding exposure to these materials even in high concentrations. This contrasts with cellulose acetate and like membranes, which must be protected from exposure to heavy hydrocarbons and water. If liquid water or $C_{3+}$ hydrocarbons condense on the surface of such membranes, as can happen as described above, the membranes can suffer catastrophic failure. On the other hand, the membranes used in the invention preferentially and rapidly pass these components, so they do not build up on the feed side. Also, unlike other types of hydrogen-rejecting membranes, such as adsorbent carbon membranes, the presence of a heavier hydrocarbon component does not have a significant negative impact on the permeation of a lighter component. For example, the presence of small amounts of $C_8$ and above hydrocarbons will not impede the ability of the membrane to remove $C_6$ components. Thus, the membranes can handle a diversity of stream types including, for example, gases containing hydrogen sulfide and comparatively heavy hydrocarbons, such as $C_{6+}$ hydrocarbons.

The invention has another important advantage over other polymeric membrane separation processes that have been used to separate hydrogen from hydrocarbons in the past: the membranes are hydrogen-rejecting. That is, the hydrocarbons permeate the membrane faster than hydrogen, leaving a residue stream on the feed side that is concentrated in the slower-permeating hydrogen. Thus, the hydrogen-enriched stream remains at the relatively high pressure of the feed side. If the selective adsorption process employed is pressure-swing adsorption, for example, this means that the stream may be passed to the adsorption step without the recompression that would be needed if the hydrogen were in the permeate stream.

Yet another benefit is that polymeric materials are used for the membranes. This renders the membranes easy and inexpensive to prepare, and to house in modules, by conventional industrial techniques, unlike other types of hydrogen-rejecting membranes, such as finely microporous inorganic membranes, including adsorbent carbon membranes, pyrolysed carbon membranes and ceramic membranes, which are very difficult and costly to fabricate in industrially useful quantities.

A pressure difference between the feed and permeate sides provides the driving force for transmembrane permeation in the membrane separation step. If the gas to be treated is already at elevated pressure, it may be passed directly to the membrane separation step. Otherwise the gas is compressed before passing to the membrane unit. Particularly preferred embodiments incorporate both a compression step and a cooling step upstream of the membrane unit, with the hydrocarbon-rich permeate from the membrane separation step recirculated to the front of the compression step. This enables the $C_5$–$C_8$ hydrocarbons to be recovered from the process in liquid form and facilitates good $C_5$–$C_8$ hydrocarbon recovery.

The membrane step may take the form of a single step or of multiple sub-steps, depending on the feed composition, membrane properties and specific desired results.

The selective adsorption step is usually carried out by pressure swing adsorption or temperature swing adsorption, such as is well known in the art. The hydrocarbons are adsorbed onto the adsorbent bed, leaving a purified hydrogen stream that is withdrawn as a product from the process. At intervals, the bed is regenerated and a waste light hydrocarbon stream is removed. This stream typically, but not necessarily, will be burnt as fuel.

Additional separation steps may be carried out between the membrane separation step and the selective adsorption step as desired.

Specific exemplary separations to which the process of the invention can be applied include, but are not limited to, separation of light hydrocarbons from hydrogen in off-gas streams from: hydrocrackers; hydrotreaters of various kinds, including hydrodesulfurization units; coking reactors; catalytic reformers; catalytic crackers; specific isomerization, alkylation and dealkylation units; steam reformers; hydrogenation and dehydrogenation processes; and steam crackers for olefin production. The invention can be applied to any streams containing hydrogen, methane and $C_5$–$C_8$ hydrocarbon in proportions to give rise to a dewpoint at 200 psia of at least 10° C. The invention is especially useful, however, for treating streams that are neither very rich in heavier hydrocarbons nor very rich in hydrogen. By this, we mean streams that contain no more than about 80% hydrogen and no more than about 10% $C_5$–$C_8$ hydrocarbon. Absent the process of the invention, such streams are typically used as fuel gas. The invention provides separation and recovery of the valuable hydrogen and heavier hydrocarbon components.

Furthermore, by recovering these components, the invention substantially reduces the fuel gas load in the plant, in favorable cases by as much as 50% or more. In plants where fuel gas generation is at capacity, the invention provides an attractive debottlenecking capability, allowing throughput of the unit operations generating the off-gas to be increased.

In an alternative embodiment, the invention can be carried out by using a hydrogen-selective membrane instead of a selective adsorption step for the hydrogen/methane separation. In this case, the invention comprises the following conditioning step:

(i) passing the gas as a feed stream across the feed side of a polymeric membrane having a feed side and permeate side, and being selective for hydrocarbons over hydrogen;

(ii) withdrawing from the permeate side a permeate stream enriched in $C_5$–$C_8$ hydrocarbon compared with the gas;

(iii) withdrawing from the feed side a conditioned residue stream comprising hydrogen and methane and having a dewpoint at 200 psia at least about 10° C. lower than the original dewpoint; and the following hydrogen/methane separation step:

(i) passing the conditioned gas as a second feed stream across the second feed side of a second polymeric membrane having a second feed side and a second permeate side, and being selective for hydrogen over hydrocarbons;

ii) withdrawing from the second permeate side a purified hydrogen product stream;

(iii) withdrawing from the second feed side a residue waste gas stream enriched in methane and depleted in hydrogen compared with the conditioned gas.

In this embodiment, the first membrane separate step serves as a conditioning step to protect the hydrogen-selective membrane from damage caused by exposure to heavier hydrocarbons.

It is to be understood that the above summary and the following detailed description are intended to explain and illustrate the invention without restricting its scope.

DETAILED DESCRIPTION OF THE INVENTION

Figure 1:
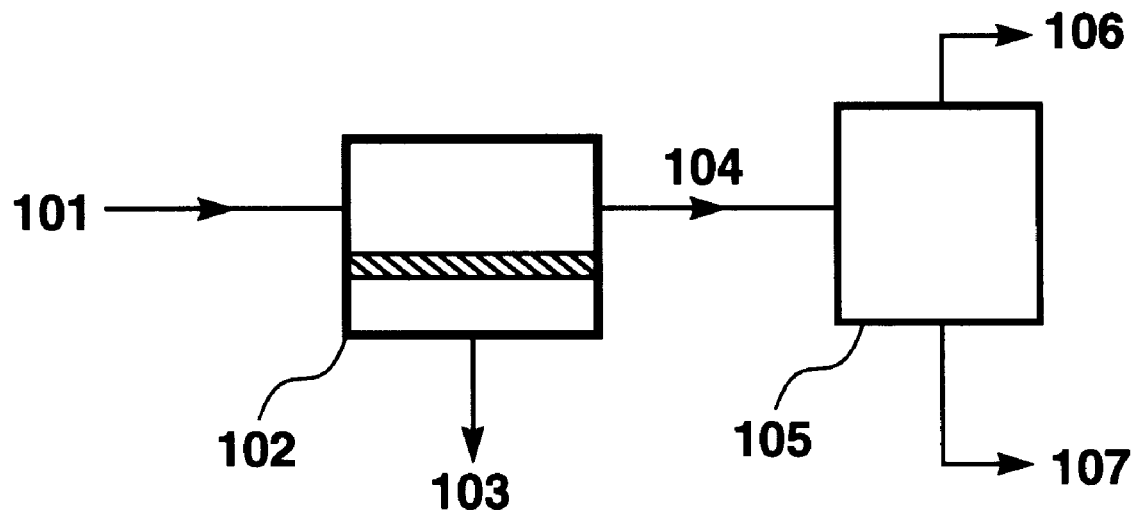
FIG. 1 is a schematic drawing showing a basic embodiment of the invention.

The terms gas and vapor are used interchangeably herein.

The term dewpoint, unless otherwise explicitly stated, means hydrocarbon dewpoint.

The term $C_5$–$C_8$ hydrocarbon means a hydrocarbon having at least five carbon atoms and no more than eight carbon atoms.

The term light hydrocarbon means a hydrocarbon having no more than four carbon atoms.

The term heavier hydrocarbon means a hydrocarbon having at least five carbon atoms.

The terms two-step and multistep as used herein mean an arrangement of membrane modules or banks of membrane modules connected together such that the residue stream from one module or bank of modules becomes the feedstream for the next.

The terms two-stage and multistage as used herein mean an arrangement of membrane modules or banks of membrane modules connected together such that the permeate stream from one module or bank of modules becomes the feedstream for the next.

The term membrane array means a set of membrane modules or banks of modules connected in a multistep arrangement, multistage arrangement, or mixtures or combinations of these.

The term product residue stream means the residue stream exiting a membrane array when the membrane separation process is complete. This stream may be derived from one membrane bank, or may be the pooled residue streams from several membrane banks.

The term product permeate stream means the permeate stream exiting a membrane array when the membrane separation process is complete. This stream may be derived from one membrane bank, or may be the pooled permeate streams from several membrane banks.

Percentages herein are by volume unless otherwise stated.

The invention is a process for treating a gas mixture containing at least hydrogen, methane and a $C_5$–$C_8$ hydrocarbon. Such gas mixtures are frequently encountered as off-gas streams from unit operations in oil refining, from petrochemical production, and similar activities. The gas mixture may contain these components in any proportions. As non-limiting examples, the gas may be predominantly hydrogen, such as 80% hydrogen or more, with small amounts of $C_1$ and $C_2$ hydrocarbons, such as 10–20%, and smaller amounts of $C_5$–$C_8$ hydrocarbons, such as 1–5%; or may be predominantly a hydrocarbon mix, such as 80% or more of $C_1$–$C_8$ hydrocarbons, with 20% or less hydrogen. The gas mixture may also contain secondary contaminants, such as hydrogen sulfide, carbon dioxide, water vapor and other organic materials. The gas mixture has a hydrocarbon dewpoint, as measured at 200 psia, of at least about 10° C. This does not mean that the gas is at 200 psia before, during or after treatment (although it could be), but merely serves to express the hydrocarbon content of the gas in a definite way. Many gas streams to be treated by the invention have higher dewpoints, such as 20° C., 30° C., 40° C. or 50° C., all as measured at 200 psia.

The primary goal of the process is to separate the gas mixture into three streams: a purified hydrogen stream, useful as a hydrogen source on-site or elsewhere; a heavier hydrocarbon stream, preferably recovered as increased product or LPG; and a light hydrocarbon stream, usable as a fuel source, or for other treatment or disposal. Depending on the specifics of the stream and on economic, geographical and other constraints, the process may optionally be configured to emphasize the hydrogen recovery capability. In other circumstances, the prime driver may be reducing the amount of fuel gas produced by a process. In yet other cases, increased product yield or LPG production will be important. Those of skill in the art will appreciate such considerations and will be able to apply the teachings herein as appropriate to specific gas mixtures and industrial circumstances.

In its most basic aspect, the invention is a process that involves a membrane separation conditioning step to reduce the dewpoint of the gas by 10° C. or more, followed by a selective adsorption step to separate the methane and other light hydrocarbons from the hydrogen. The membrane separation step serves as a gas conditioning step to remove components that may be harmful to the selective adsorption step, particularly $C_5$–$C_8$ hydrocarbons, and to reduce and change the nature of the load on the selective adsorption step.

In another aspect, the invention is apparatus for carrying out the process.

Although it can be used in any field where gas mixtures of hydrocarbons and hydrogen are found, the invention is expected to be of particular use in the fields of oil refining and petrochemical production. Those of skill in the art will appreciate that numerous opportunities exist for its employment in those areas, and that the brief discussion of a few applications that follows is intended to be exemplary rather than limiting.

As a first example, the major consumers of hydrogen in a refinery are the hydroprocessing units. Hydroprocessing covers various refinery operations, including, but not limited to, catalytic hydrodesulfurization (CHD), hydrotreating to remove other contaminants, pretreatment of reformer feedstocks, and hydrocracking to break down polycyclic aromatic compounds. Modern refineries often carry out these operations together, such as in multi-stage reactors, where the first stage predominantly converts sulfur compounds and the second stage predominantly performs the cracking step. In hydroprocessing, fresh feed is mixed with hydrogen and recycle gas and fed to the reactor, where the desired reactions take place in the presence of a suitable catalyst. For example, hydrogen is consumed to form hydrogen sulfide from mercaptans and the like, to form paraffins from olefins, and to open and saturate aromatic rings. As a result, light components formed include methane, ethane and hydrogen sulfide. The reactor effluent enters a separator, usually at high pressure, from which a hydrogen-rich vapor fraction is withdrawn and returned to the reactor. The hydrogen demand varies, depending on the specifics of the operation being performed, and may be as low as 200 scf/bbl or less for desulfurization of naphtha or virgin light distillates, 500–1,000 scf/bbl for treating atmospheric resid, upwards of 1,000 scf/bbl for treatment of vacuum resid, and as high as 5,000–10,000 scf/bl for hydrocracking.

Not all of this hydrogen is consumed in the reactions. Reactors are generally run with an excess of hydrogen in the feed to protect the catalyst from coke formation, thereby prolonging the cycle time of the reactor. Generous use of hydrogen also promotes high levels of sulfur removal and depresses the formation of unsaturated compounds, which tend to be of lower value in this context.

As a function of these requirements, the light gas fraction recirculated from the separators to the reactors is rich in hydrogen, and may consist of as much as 80 vol % or more hydrogen. Other components are typically $C_1$–$C_3$ hydrocarbons, hydrogen sulfide, heavier hydrocarbons, carbon dioxide, nitrogen ammonia and other trace materials. If certain of these components, such as the light hydrocarbons and hydrogen sulfide, are allowed to build up in the reactor loop, they gradually change the composition of the reactor mix and adversely affect the product yield and the catalyst. To prevent this build-up, a portion of gas is usually purged from the reactor return loop. This gas is submitted to one or more treatment steps, typically further phase separation and stripping, and the light overhead gas from these operations is pooled with other off-gas streams and sent to the gas treatment plant or to the fuel line. The invention can be used to treat these light ends to increase recovery of $C_5$–$C_8$ hydrocarbons and/or hydrogen before the gas is burnt.

Another important exemplary application of the invention is in catalytic reforming, the primary goal of which is to improve the octane quality of gasoline feedstocks. The reformer is a net hydrogen producer, and in most refineries hydrogen thus generated is used in other units, such as the hydrotreaters. In the reformer, the n-paraffin components of virgin or cracked naphthas are converted to higher octane iso-paraffins and aromatics. The process is generally carried out in three reaction zones, in each of which specific reactions are favored. For example, the first zone may perform, among other reactions, dehydrogenation of methylcyclohexane to toluene, the second zone may perform dehydroisomerization, such as conversion of heptane to toluene, and the third zone may perform isomerization of normal to iso-heptane. Although the process is an overall producer of hydrogen, hydrogen is recycled back to the feed to maintain the hydrogen-to-hydrocarbon ratio in the reactors within a range to favor the desired reactions and to prolong the catalyst life.

The gaseous effluent from the reactor series is cooled and separated into liquid and vapor phases. The vapor phase may be subjected to other hydrogen purification steps, and is divided into two streams, one for return to the reformer, the other for use elsewhere in the refinery. The invention can be used as part of the vapor phase treatment, to enhance recovery of valuable products.

A third exemplary application is in isomerization, a broad term that covers a variety of specific operations. In the refinery, isomerization is used to improve the quality of light straight-run gasoline by converting normal $C_5$ and $C_6$ paraffins to iso-paraffins. Another important use is conversion of n-butane to iso-butane for alkylate manufacture. Isomerization is used in the petrochemical industry to convert isomers of butene, pentene, hexene and other olefins to preferred forms as feedstocks for other processes, such as MTBE and TAME manufacture. Another important petrochemical application of isomerization is the conversion of other $C_8$ compounds into paraxylene, the starting feedstock for polyester manufacture. Although isomerization reactions themselves do not consume hydrogen, hydrogen is used in the isomerization reactor gas mix to protect the catalyst from coking, and small amounts of hydrogen are consumed by secondary reactions that take place. The layout of the process is often, therefore, similar to those already described; the effluent from the reactors is cooled and separated into liquid and vapor phases, and, after purging as necessary, the vapor phase is recirculated to the reactors. The invention can be used as described above to treat off-gases from separators or other treatment units to provide selective additional recovery of hydrocarbons with little hydrogen loss.

A fourth opportunity for our process is in hydrodealkylation, principally benzene production from toluene. The toluene/benzene conversion is usually performed by cracking at high temperature, such as above 600° C., in the presence of hydrogen. Typically a molar ratio of hydrogen to hydrocarbon of about 4 is used, and the process consumes as much as 1,500 scf of hydrogen per barrel of hydrocarbon processed. In the typical process, toluene, make-up hydrogen and recycle hydrogen are heated and enter the reactor, where toluene and hydrogen react to form benzene and methane. The effluent is withdrawn from the reactor and passed through separators that both cool and reduce the pressure of the effluent. The hydrocarbon liquid mixture that results is stabilized, then the benzene product is separated from the heavier aromatics, at least part of which is recycled to the reactor for further conversion. The vapor phase from the separators is subjected to additional hydrogen purification if necessary and the remaining hydrogen is returned for reuse in the reactor. As can be seen, the opportunity again exists to apply our process as part of the treatment of overhead gases from the phase separators or of the light ends from the stabilizer column.

The invention in a basic aspect is shown schematically in FIG. 1. It will be appreciated by those of skill in the art that this, and the other figures described below, are very simple schematic diagrams, intended to make clear the key aspects of the invention, and that an actual process train will usually include many additional components of a standard type, such as heaters, chillers, condensers, pumps, blowers, other types of separation and/or fractionation equipment, valves, switches, controllers, pressure-, temperature-, level- and flow-measuring devices and the like.

Referring now to FIG. 1, stream 101, the gas mixture containing hydrogen, methane and a $C_5$–$C_8$ hydrocarbon, and having a dewpoint at 200 psia of at least 10° C., enters the membrane separation step or unit, 102. The membrane unit contains a membrane that exhibits a substantially different permeability for the $C_5$–$C_8$ hydrocarbons than for hydrogen.

The permeability of a gas or vapor through a membrane is a product of the diffusion coefficient, D, and the Henry's law sorption coefficient, k. D is a measure of the permeant's mobility in the polymer; k is a measure of the permeant's sorption into the polymer. The diffusion coefficient tends to decrease as the molecular size of the permeant increases, because large molecules interact with more segments of the polymer chains and are thus less mobile. The sorption coefficient depends, amongst other factors, on the condensability of the gas.

Depending on the nature of the polymer, either the diffusion or the sorption component of the permeability may dominate. In rigid, glassy polymer materials, the diffusion coefficient tends to be the controlling factor and the ability of molecules to permeate is very size dependent. As a result, glassy membranes tend to permeate small, low-boiling molecules, such as hydrogen and methane, faster than larger, more condensable molecules, such as $C_{2+}$ organic molecules. For rubbery or elastomeric polymers, the difference in size is much less critical, because the polymer chains can be flexed, and sorption effects generally dominate the permeability. Elastomeric materials, therefore, tend to permeate large, condensable molecules faster than small, low-boiling molecules. Thus, most rubbery materials are selective in favor of $C_{5+}$ hydrocarbons over hydrogen, and can be used in the invention.

However, for the smallest, least condensable hydrocarbons, methane in particular, even rubbery polymers tend to be selective in favor of hydrogen, because of the relative ease with which the hydrogen molecule can diffuse through most materials. For example, neoprene rubber has a selectivity for hydrogen over methane of about 4, natural rubber a selectivity for hydrogen over methane of about 1.6, and Kraton, a commercial polystyrene-butadiene copolymer, has a selectivity for hydrogen over methane of about 2.

Any rubbery material that is selective for $C_{2+}$ hydrocarbons over hydrogen will provide selective purging of these components and can be used in the invention. Examples of polymers that can be used to make such elastomeric membranes, include, but are not limited to, nitrile rubber, neoprene, polydimethylsiloxane (silicone rubber), chlorosulfonated polyethylene, polysiliconecarbonate copolymers, fluoroelastomers, plasticized polyvinylchloride, polyurethane, cis-polybutadiene, cis-polyisoprene, poly (butene-1), polystyrene-butadiene copolymers, styrene/butadiene/styrene block copolymers, styrene/ethylene/butylene block copolymers, and thermoplastic polyolefin elastomers.

The process of the invention is carried out using a membrane selective for the $C_5$–$C_8$ hydrocarbons over hydrogen. It is most preferred, although not essential, that the membrane be selective for all hydrocarbons, including methane, over hydrogen, as this minimizes the loss of hydrogen into the permeate stream.

To applicants' knowledge, among the polymeric membranes that perform gas separation based on the solution/diffusion mechanism, silicone rubber is the only material that is selective in favor of methane over hydrogen, although any polymeric membrane that is found to have a methane/hydrogen selectivity greater than 1 can also be used as a preferred membrane material. For example, other materials that might perhaps be found by appropriate experimentation to be methane/hydrogen selective include other polysiloxanes.

Another class of polymer materials that has at least a few members that should be methane/hydrogen selective, at least in multicomponent mixtures including other more condensable hydrocarbons, is the superglassy polymers, such as poly(1-trimethylsilyl-1-propyne) [PTMSP] and poly(4-methyl-2-pentyne)[PMP]. These differ from other polymeric membranes in that they do not separate component gases by solution/diffusion through the polymer. Rather, gas transport is believed to occur based on preferential sorption and diffusion on the surfaces of interconnected, comparatively long-lasting free-volume elements. Membranes and modules made from these polymers are less well developed to date; this class of materials is, therefore, less preferred than silicone rubber.

A third type of membrane that may optionally be used if the gas mixture contains hydrogen sulfide is one in which the selective layer is a polyamide-polyether block copolymers having the general formula

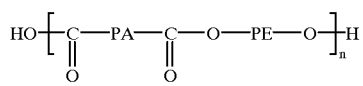

where PA is a polyamide segment, PE is a polyether segment and n is a positive integer. Such polymers are available commercially as Pebax® from Atochem Inc., Glen Rock, N.J., or as Vestamid® from Nuodex Inc., Piscataway, N.J. These types of materials are described in detail in U.S. Pat. No. 4,963,165, for example. Such membranes will remove hydrogen sulfide with a very high selectivity, such as 20 or more, for hydrogen sulfide over hydrogen.

The membrane separation step is used to condition the gas mixture to facilitate the selective adsorption step that follows; the purged materials are removed from the conditioning step as permeate stream 103. The membranes permeate all $C_{5+}$ hydrocarbons, hydrogen sulfide, carbon monoxide, carbon dioxide, water vapor and ammonia faster than hydrogen. Thus, permeate stream 103 is substantially enriched in hydrocarbons, and the other components mentioned above, if they are present, and depleted in hydrogen, compared with feed stream 101.

Those of skill in the art will appreciate that the membrane area and membrane conditioning step operating conditions can be varied depending on the components of interest to be removed by the conditioning step. For example, the concentration of $C_5$–$C_8$ hydrocarbon components might be raised from 2 vol % in the feed to 10 vol % in the permeate, and/or the hydrogen sulfide concentration might be raised from 5% to 20%. Correspondingly, the hydrogen content may drop from 75 vol % in the feed to 50 vol % or less in the permeate. Keeping the hydrogen content in the permeate low is desirable, because hydrogen lost here is not available for recovery later in the selective adsorption step. Typically, it is possible, as illustrated in the examples section below, to meet the conditioning target of at least 10° C. dewpoint reduction, and at the same time keep the hydrogen loss to no more than 20%, 10% or less of the total hydrogen content of the feed stream.

The permeate stream is withdrawn from the process and subjected to further treatment or used as desired. Frequently, it will be convenient to cool and condense at least a portion of the permeate for use as LPG (liquid petroleum gas), or to add it to the reactor product stream.

By selectively removing non-hydrogen components, the process results in a membrane residue stream, 104, that is enriched in hydrogen content compared with stream 101. Of course, the membrane separation unit can be configured and operated to provide a residue stream that has a significantly higher hydrogen concentration compared with the feed, such as 30%, 40%, 50% or more higher than the feed, subject only to the presence of any other slow-permeating components in the feed. This can be accomplished by increasing the stage-cut of the membrane separation step, that is, the ratio of permeate flow to feed flow, to the point that little of anything except hydrogen is left in the residue stream. As the stage-cut is raised, however, the permeate stream becomes progressively more diluted by the slower permeating components. This can be clearly seen by considering that, in the limit, if the stage-cut were allowed to go to 100%, all of the gas present in the feed would pass to the permeate side of the membrane and the permeate would have the same composition as the feed. Since the purpose of the membrane separation step is to condition the gas by selectively removing certain components, while controlling the loss of hydrogen with those components, a very high stage-cut, and hence a high hydrogen concentration in the residue, defeats the purpose of the invention. Furthermore, it is not required for the membrane separation step to achieve any significant separation between the lightest hydrocarbons and hydrogen, since this separation is performed by the adsorption step. It is preferred, therefore, to keep the stage-cut low, such as below 50%, more preferably below 40% and most preferably below 30%.

On this basis, the residue stream, 104, will, generally, be enriched in hydrogen compared with the feed, but typically only by a small amount, such as 1%, 2%, 5% or 10%. Thus, the membrane conditioning step provides only slight enhancement of the hydrogen content of the gas, and provides little, if any, significant separation between the hydrogen and the lightest hydrocarbons, specifically methane. The residue stream has a hydrocarbon dewpoint substantially below the dewpoint of the feed stream, 101. The lower the hydrocarbon dewpoint, the easier will the gas be to treat in the subsequent selective adsorption step, because components that are difficult to desorb have been reduced or removed. By substantially below, we mean that the dewpoint of stream 104 at 200 psia is at least about 10° C. lower than the dewpoint of stream 101 at 200 psia, preferably at least about 20° C. lower, more preferably at least about 30° C. lower and most preferably at least about 40° C. lower. The amount of $C_5$–$C_8$ hydrocarbon removal that this represents will depend, of course, on the specific components present in the feed. As a non-limiting example, in a stream containing $C_5$, $C_6$, $C_7$ and $C_8$ components, all at concentrations of less than 1%, a 10° C. reduction in dewpoint might represent removal of $C_8$ only, a 20° C. reduction in dewpoint might represent removal of most $C_6$–$C_8$, and a 40° C. reduction in dewpoint might represent removal of essentially all $C_5$–$C_8$ hydrocarbon components, plus some lighter components. Expressing the preferences for the residue stream characteristics in terms if removal of $C_5$–$C_8$ hydrocarbons, it is most preferred to remove at least 99% of all $C_5$–$C_8$ hydrocarbons, insofar as this will provide the most conditioning, and hence the most protection for the following selective adsorption step. However, depending on the composition of the feed stream, in particular the proportions of the individual $C_5$–$C_8$ hydrocarbons and the proportions of hydrogen, this may result in undesirable hydrogen loss into the permeate. The tradeoff between acceptable levels of conditioning, acceptable levels of hydrogen in the permeate and acceptable costs can be established by those of skill in the art having regard to the teachings herein. In general, we prefer to run the membrane conditioning step so as to remove at least about 80%, more preferably at least about 90% of all $C_5$–$C_8$ hydrocarbons in the feed to the selective adsorption step.

A benefit of using rubbery or superglassy membranes is that they provide much higher transmembrane fluxes than conventional glassy membranes. For example, the permeability of silicone rubber to methane is 800 Barrer, compared with a permeability of less than about 10 Barrer for 6FDA polyimide or cellulose acetate.

The membrane may take any convenient form known in the art. The preferred form is a composite membrane including a microporous support layer for mechanical strength and a silicone rubber coating layer that is responsible for the separation properties. Additional layers may be included in the structure as desired, such as to provide strength, protect the selective layer from abrasion, and so on.

The membranes may be manufactured as flat sheets or as fibers and housed in any convenient module form, including spiral-wound modules, plate-and-frame modules and potted hollow-fiber modules. The making of all these types of membranes and modules is well known in the art. Flatsheet membranes in spiral-wound modules are our most preferred choice. Since conventional polymeric materials are used for the membranes, they are relatively easy and inexpensive to prepare and to house in modules, compared with other types of membranes that might be used as hydrogen-rejecting membranes, such as finely microporous inorganic membranes, including adsorbent carbon membranes, pyrolysed carbon membranes and ceramic membranes.

To achieve a high flux of the preferentially permeating hydrocarbons, the selective layer responsible for the separation properties should be thin, preferably, but not necessarily, no more than 30 $\mu$m thick, more preferably no more than 20 $\mu$m thick, and most preferably no more than 5 $\mu$m thick. If superglassy materials are used, their permeabilities are so high that thicker membranes are possible.

Depending on the composition of the membrane feed stream 101, a single-stage membrane separation operation may condition the feed stream adequately. However, if needed, membrane unit 102 may contain an array of modules. If the residue stream requires further conditioning, it may be passed to a second bank of membrane modules for a second processing step. If the permeate stream requires further concentration, such as to facilitate recovery of LPG, it may be passed to a second bank of membrane modules for a second-stage treatment. Such multistage or multistep processes, and variants thereof, will be familiar to those of skill in the art, who will appreciate that the membrane separation step may be configured in many possible ways, including single-stage, multistage, multistep, or more complicated arrays of two or more units in serial or cascade arrangements. If an array of membrane modules is used, the stage-cut preferences cited above for obtaining good $C_5$–$C_8$ hydrocarbon removal and low loss of hydrogen refer to the overall stage-cut of the array. In other words, the stage-cut is the ratio of the total product permeate flow to raw feed flow to the first membrane bank in the array.

A driving force for transmembrane permeation is provided by a pressure difference between the feed and permeate sides of the membrane. At least some of the gas streams to be treated by the invention, such as those emerging from various refinery operations, will be at elevated pressure, such as 100 psia, 200 psia, 500 psia or above. Feed pressures at this level will be adequate in many instances to provide acceptable membrane performance. In favorable cases such as this, the membrane separation unit requires no additional compressors or other pieces of rotating equipment. If the pressure of stream 101 is insufficient to provide adequate driving force, a compressor may be included in line 101, as discussed in more detail below.

An advantage of using a hydrogen-rejecting membrane is that the stream containing the hydrogen and light hydrocarbons remains on the high-pressure side of the membrane. Thus, residue stream, 104, remains at or close to the pressure of stream 101, subject only to a slight pressure drop along the feed surface of the membrane modules. This means that in many cases, stream 104 can pass directly to the selective adsorption step, 105, without additional compression, as shown in FIG. 1. Alternatively, a compressor can be included in line 104 to boost the pressure as necessary.

The selective adsorption step may be carried out in any convenient manner known in the art, such as by thermal swing adsorption or pressure swing adsorption (PSA). PSA is preferred. Selective adsorption systems usually comprise a series of beds of a zeolite or similar material that will selectively sorb one or more components of the gas mixture. The beds are connected in such a way that each bed can be switched periodically from adsorption mode to regeneration mode. As one bed or set of beds is taken off-line for regeneration, another bed or set of beds is switched in so that gas can be processed continuously. In the sorption mode, which is typically carried out at elevated pressure, such as 200 psia, 300 psia, 500 psia or above, light hydrocarbons are adsorbed onto the active beds. The gas exiting the bed, stream 106, has a high hydrogen content, such as 99 vol % hydrogen or higher and can be used as a source of hydrogen as desired.

When the adsorbing beds have been charged to the desired level, they are switched into desorption/regeneration mode. The desorption/regeneration step can be carried out by any convenient techniques known in the art. Such techniques include, but are not limited to, passing a displacement gas cocurrently through the bed to sweep out unadsorbed gas from the void spaces, cocurrent depressurization of the bed to position the mass transfer front appropriately, countercurrent depressurization to remove previously adsorbed gas, and countercurrent purging to complete regeneration of the bed for reuse.

Depressurization of the bed during these steps may take place by multiple reductions in pressure, as is known in the art. Preferably, the adsorption step is carried out at a pressure no higher than about 500 psia, and more preferably in the range 50–500 psia. Removal of void space gas and positioning of the mass transfer front is preferably carried out at a pressure in the range 50–250 psia, and countercurrent desorption is preferably carried out at a pressure no lower than 15 psia, more preferably in the range 15–75 psia, yet more preferably no lower than about 30 psia and most preferably no lower than about 50 psia.

By way of non-limiting example, a typical bed cycle may be: (i) adsorption at 500 psia; (ii) depressurization to 200 psia under cocurrent flow conditions; (iii) depressurization to 50 psia under countercurrent flow conditions; (iv) purging at 50 psia; (v) repressurization.

Since the heavier hydrocarbon components and other relatively condensable components are removed by the conditioning step, operation of the desorption/regeneration step at subatmospheric pressure, while optional, is not generally necessary. It is normally possible, by following the teachings herein, to operate with the lowest pressure in the desorption/regeneration step no lower than 15 psia, more preferably no lower than 25 psia, and most preferably no lower than about 50 psia.

The gases that are removed during the desorption/regeneration steps are shown generally in FIG. 1 as stream 107. Stream 107 may be a single stream, as shown, or more commonly will be several streams from the individual steps.

This stream or streams typically comprise mostly methane and other light hydrocarbons, and are sent to the fuel gas line, but can optionally pass to other destinations on a case-by-case basis as the composition of the gas renders it suitable.

Depending on the original gas composition, the process of FIG. 1 can reduce the gas sent to the fuel line by 50% or more as shown in the Examples. A useful result is that some plants that were previously bottlenecked by fuel gas production are able to increase throughput in the reactors, thereby increasing product yield.

Figure 2:
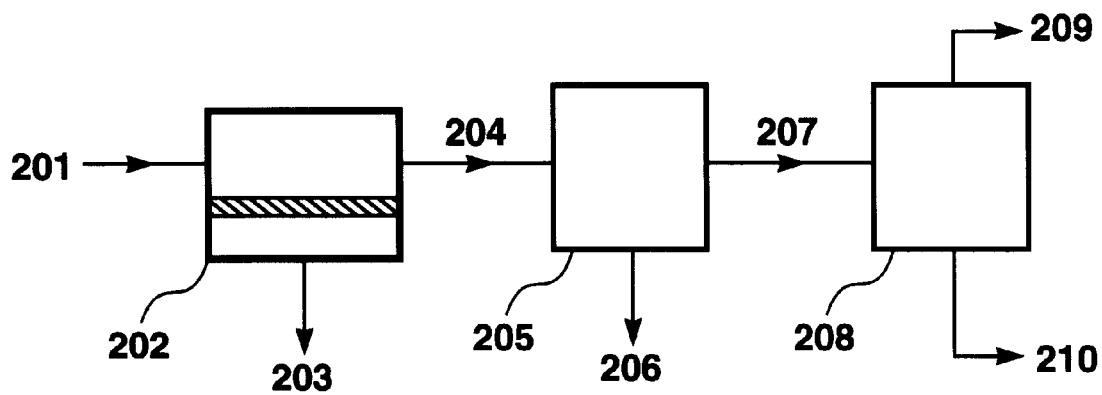
FIG. 2 is a schematic drawing showing an embodiment of the invention in which an ancillary treatment step is included between the membrane conditioning step and the selective adsorption step.

It will be appreciated by those of skill in the art that ancillary treatments can be included to enhance the performance of the invention. An alternative embodiment of the invention in this aspect is shown in FIG. 2. Referring to this figure, stream 201, containing hydrogen, methane and a $C_5$–$C_8$ hydrocarbon, and having a dewpoint at 200 psia of at least about 10° C., enters the membrane separation step or unit, 202. As before, the membrane unit contains a membrane that exhibits selectivity in favor of $C_5$–$C_8$ hydrocarbons over hydrogen, and all the issues, considerations, choices and preferences discussed above with regard to the membrane separation step of FIG. 1 apply equally to this embodiment. Optionally, a compressor may be installed in line 201 to raise the gas pressure to any desired pressure. The $C_5$+ hydrocarbons permeate the membrane and are removed as $C_5$+ hydrocarbons concentrated stream 203. The remaining gas is withdrawn from the feed side of the unit as residue stream 204. This stream passes as feed into ancillary treatment unit, 205. This unit carries out separation of hydrogen from the remaining hydrocarbons in stream 204 to form two streams, 206, which is withdrawn, and 207, which passes to the selective adsorption step. Any treatment that is able to perform a separation of hydrogen from hydrocarbons may be used for step 205. Such treatments include, but are not limited to, absorption of the hydrocarbons into a suitable medium, such as a hydrocarbon liquid or the like, further separation by a hydrocarbon-selective membrane, and membrane separation by a hydrogen-selective membrane, such as a cellulose acetate membrane, a polyimide membrane or the like. Treatments of this type are very familiar to those of skill in the art. For example, if the ancillary treatment is separation by a hydrogen-selective membrane, the membrane unit can be configured to recover a permeate stream of high hydrogen purity, leaving a residue stream that still has a comparatively high hydrogen content. In this case, the residue stream will pass on as stream 207 for treatment in the selective adsorption step, 208, and stream 206 will form an additional high purity hydrogen product stream. Alternatively, but less preferably, the residue light hydrocarbon stream is withdrawn as stream 206, and the hydrogen-enriched stream, 207, passes on for further treatment.

Stream 207 passes into selective adsorption step 208, which may be carried out in any convenient manner, such as described in relation to FIG. 1 above. The purified hydrogen product stream, 209, is withdrawn for use as desired, and the desorbed light hydrocarbons are withdrawn as stream 210. Embodiments of this type are particularly useful and preferred for treating gases with an initially low hydrogen content, such as less than about 40% hydrogen, to boost the hydrogen content of the feed to the selective adsorption step, such as to 60% hydrogen or above.

As stated above, the preferred membranes used in the invention permeate hydrocarbons, hydrogen sulfide and water vapor preferentially, so pretreatment steps before the membrane separation step to remove these components are not required. If desired, however, an ancillary treatment prior to the membrane conditioning step may be added as convenient to specific circumstances. As a non-limiting example, the stream may be saturated with water vapor, and it may be preferred to remove the water in an upstream step, so that the membrane permeate stream is dry. In this case the ancillary treatment step may be a dehydration step, such as glycol absorption, silica gel adsorption or adsorption onto a molecular sieve. Of these, dehydration by molecular sieve is preferred, as the sieves are highly selective and can be regenerated easily using a hot gas stream.

As a second non-limiting example, the feed stream to the process may be at comparatively low pressure, such as atmospheric pressure (15 psia) or just a little above atmospheric pressure, such as 20 psia, 30 psia or 50 psia. The treatment of such a stream will be aided by compressing the stream to a higher pressure, such as 100 psia, 200 psia, 300 psia or 500 psia, before passing the gas into the membrane conditioning step. In situations where the gas contains significant amounts of the $C_5$–$C_8$ hydrocarbons, such as a few percent or more, compression may raise the dewpoint temperature considerably. Thus, the ancillary treatment step could include compression followed by cooling, resulting in condensation of a portion of the heavier hydrocarbon components in liquid form. To condense the heavier hydrocarbon fraction, it is usually possible, and is preferred, to use only modest cooling of the stream, such as to no lower than about 20° C. or 10° C.

Figure 3:
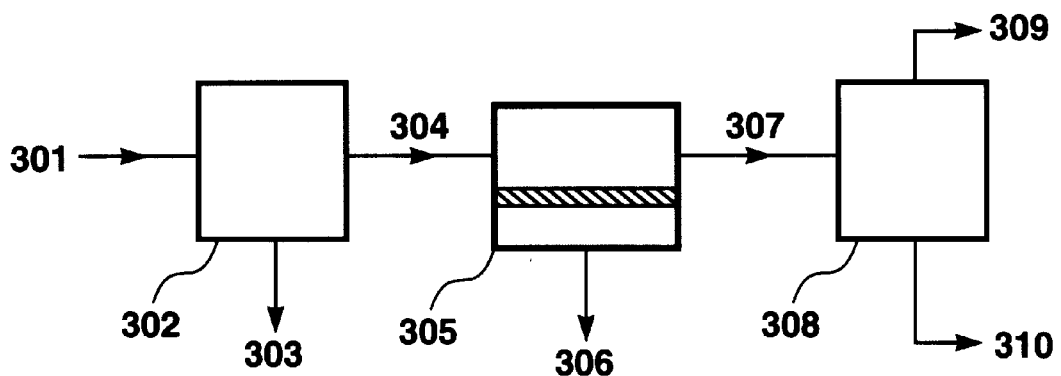
FIG. 3 is a schematic drawing showing an embodiment of the invention in which an ancillary treatment step is included upstream of the membrane conditioning step.

An embodiment in which an ancillary treatment is provided prior to the membrane conditioning step is shown in FIG. 3. Referring to this figure, stream 301, containing hydrogen, methane and $C_5$–$C_8$ hydrocarbons, and having a dewpoint at 200 psia of at least 10° C., passes as feed to ancillary treatment unit, 302, adapted to perform any desired treatment of the raw gas, including dehydration, removal of heavy hydrocarbon liquid, and removal of other contaminants. The step results in a stream 303, which is withdrawn. In the case of dehydration, stream 303 comprises water. In the case of compression/condensation, stream 303 comprises $C_5$–$C_8$ hydrocarbons. This stream can be directed to any appropriate destination, depending to some extent on the source of the gas being treated. Frequently it is possible to direct stream 303 to a fractionator, stabilization column, debutanizers or the like that is already in use in the plant. For example, if the gas is from a catalytic reformer, the $C_5$–$C_8$ hydrocarbon components recovered here can be added to the reforrnate and will increase overall product yield.

The remainder of the stream passes on as stream 304 to the membrane separation step or unit, 305. In the case of compression/condensation, stream 304 is now saturated with hydrocarbons under the prevailing pressure and temperature conditions. Even though the stream is saturated, however, it can be passed safely to the membrane conditioning step, because the membranes used are able to handle such streams.

As before, the membrane unit contains a membrane that exhibits selectivity in favor of $C_{5+}$ hydrocarbons over hydrogen, and all the issues, considerations, choices and preferences discussed above with regard to the membrane separation step of FIG. 1 apply equally to this embodiment. The $C_{5+}$ hydrocarbons permeate the membrane and are removed as $C_{5+}$ hydrocarbons concentrated stream 306. The remaining gas is withdrawn from the feed side of the unit as residue stream 307, and passes to the selective adsorption step, 308. which may be carried out in any convenient manner, such as described in relation to FIG. 1 above. The purified hydrogen product stream, 309, is withdrawn for use as desired, and the desorbed light hydrocarbons are withdrawn as stream 310.

When the ancillary treatment step is compression/condensation, the scheme shown in FIG. 3 will produce two $C_{5+}$ hydrocarbon streams, liquid stream 303 and permeate vapor stream 306. In this case, it is preferred to return permeate vapor stream 306 to the inlet of the compression/condensation step, so that all of the $C_{5+}$ hydrocarbon is recovered in stream 303. Arrangements of this type in which a compression/condensation step and a membrane separation step are integrated together are described, for example, in U.S. Pat. No. 5,199,962, incorporated herein by reference.

Figure 4:
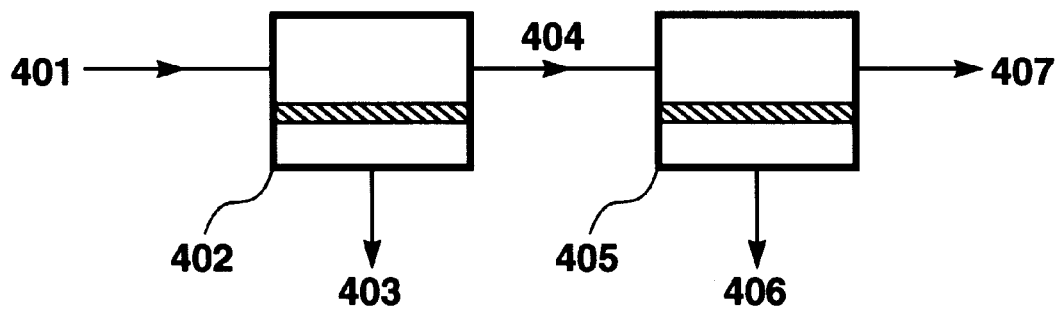
FIG. 4 is a schematic drawing showing an embodiment of the invention using two membrane separation steps.

In another aspect, the invention can be carried out by using a hydrogen-selective membrane instead of a selective adsorption step for the light hydrocarbon/hydrogen separation. In this case, the first membrane separation step serves as a conditioning step to protect the hydrogen-selective membrane used for the hydrogen/light hydrocarbon separation from damage caused by exposure to heavier hydrocarbons, acid gases or water vapor. A schematic drawing of this embodiment of the invention is shown in FIG. 4. Referring to this figure, stream 401, the gas mixture containing hydrogen, methane and a $C_{5-C8}$ hydrocarbon, and having a dewpoint at 200 psia of at least 10° C., enters the membrane separation step or unit, 402. If the pressure of stream 401 is insufficient to provide adequate driving force, a compressor may be included in line 401. The membrane unit contains a membrane that is selective in favor of the $C_5-C_8$ hydrocarbon over hydrogen. This membrane separation step corresponds to the membrane separation step in FIG. 1, and all the issues, considerations, choices and preferences discussed above with regard to the membrane separation step of FIG. 1 apply equally to this embodiment. In particular, it is most preferred that the membrane be selective for all hydrocarbons, including methane, over hydrogen, as this minimizes the loss of hydrogen into the permeate stream.

The preferred membranes for use in this step are rubbery membranes and superglassy membranes, and the most preferred membrane material is silicone rubber. As before, the polyamide-polyether block copolymers may be particularly suitable if the gas mixture contains hydrogen sulfide.

Since the conditioning membranes permeate all $C_{5+}$ hydrocarbons, hydrogen sulfide, carbon monoxide, carbon dioxide, water vapor and ammonia faster than hydrogen, the permeate stream, 403, is substantially enriched in hydrocarbons, and the other components mentioned above, if they are present, and depleted in hydrogen, compared with feed stream 401. Permeate stream 403 is withdrawn and sent to any appropriate destination as discussed above.

The conditioning membrane area and conditioning step operating conditions can be varied to suit the specific circumstances of the separation, as discussed above, and the result will be that the permeate stream has a much higher $C_5-C_8$ hydrocarbon content and a much lower hydrogen content than the feed. The residue stream, 404, has a much lower $C_5-C_8$ hydrocarbon content, and a slightly enriched hydrogen content, such as 1%, 2%, 5% or 10% higher than the feed stream 401.

As before, the membranes and modules may take any convenient forms, and the membrane separation step may be configured to include a single-stage operation, or an array of multiple stages and/or steps.

Residue stream 404 remains at or close to the pressure of stream 401, subject only to a slight pressure drop along the feed surface of the membrane modules. This means that in many cases, stream 404 can pass directly to the second membrane separation step, 405, without additional compression, as shown in FIG. 4. Alternatively, a compressor can be included in line 404 to boost the pressure as necessary.

The second membrane separation step, 405, is used to separate hydrogen from methane and other light hydrocarbons. The membranes used in this second step are different from the membranes used in the conditioning step in that they are selective in favor of hydrogen over hydrocarbons. As explained above, the permeability of a gas or vapor through a membrane is a product of the diffusion coefficient, D, and the Henry's law sorption coefficient, k, and the diffusion coefficient tends to decrease as the molecular size of the permeant increases.

In glassy polymers, the diffusion coefficient tends to dominate, and glassy membranes tend to be selective in favor of small, low-boiling molecules. Thus for this step, the preferred membranes are made from glassy polymer materials that will pass hydrogen preferentially over methane and the other light hydrocarbons. Such membranes are well known in the art and are described, for example, in U.S. Pat. Nos. 4,230,463, to Monsanto, and 3,567,632 to DuPont. Suitable membrane materials include, but are not limited to, cellulose esters, polysulfone and polyimide. It is preferred that the membranes exhibit a hydrogen/methane selectivity of at least about 5, more preferably at least about 10, and most preferably at least about 50. Selectivities at least as high as this can be provided by modern commercial polyimide membranes, for example. It is also preferred that the membranes exhibit a hydrogen flux of at least about $1\times10^{-6}$ cm$^3$(STP)/cm$^2$·s·cmHg, more preferably at least about $10\times10^{-6}$ cm$^3$(STP)/cm$^2$·s·cmHg, and most preferably at least about $100\times10^{-6}$ cm$^3$(STP)/cm$^2$·s·cmHg.

The hydrogen/methane separation membranes may take any form known in the art. The preferred glassy materials that provide good hydrogen/methane selectivity tend to have low permeabilities compared with the conditioning membranes, such as a hydrogen permeability of only 10 Barrer. The preferred form for the membranes is, therefore, integrally skinned asymmetric hollow fibers, which can provide both a very thin selective skin layer and a high packing density, to facilitate use of large membrane areas.

As an alternative to polymeric membranes, hydrogen-selective membranes may also be chosen from inorganic membranes, including ceramic membranes, described in U.S. Pat. No. 366,081, and subsequently in many more recent patents, and metal membranes, described in U.S. Pat. No. 1,174,631, and more recently in U.S. Pat. No. 4,857,080, incorporated herein by reference, which describes particularly preferred metal membranes.

As with the conditioning step, the hydrogen/methane separation step may include a single-stage membrane unit or an array of modules in a multistage, multistep or combination design.

The permeate stream, 406, is the hydrogen product stream. The concentration of hydrogen in stream 406 depends on the composition of stream 404 and the specifics of the membrane separation step. It is preferred to operate the hydrogen/methane separation step to achieve a hydrogen product stream containing at least 90% hydrogen, more preferably at least 95% hydrogen and most preferably at least 98% hydrogen. Those of skill in the art will appreciate that the highest permeate hydrogen concentration is achieved with the lowest hydrogen recovery from feed to permeate and vice versa, and that the optimum balance between recovery and purity will vary from circumstance to circumstance.

The residue stream, 407, is enriched in light hydrocarbons and depleted in hydrogen compared with stream 404 and is usually directed to the fuel gas line. The same considerations and benefits in terms of product recovery and reduction in fuel gas generation as discussed above with respect to the embodiment of FIG. 1 apply to this embodiment.

Figure 5:
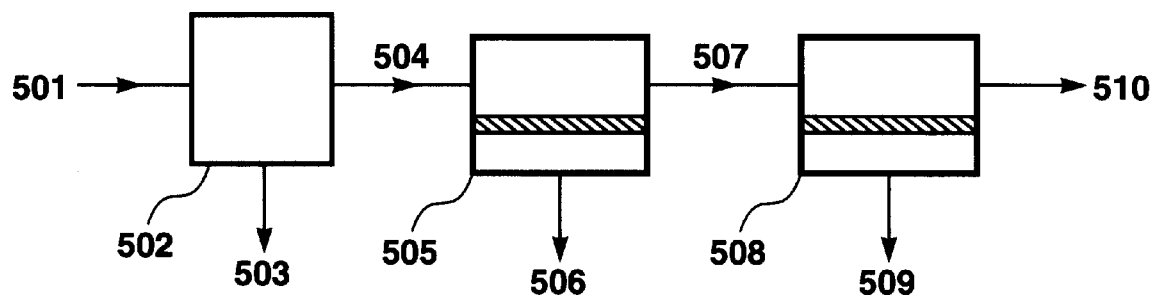
FIG. 5 is a schematic drawing showing an embodiment of the invention using two membrane separation steps, with an ancillary upstream treatment step.

It is also possible to incorporate ancillary treatments, upstream, downstream or between the membrane conditioning step and the membrane hydrogen/methane separation step, following the same general principles as in the embodiments that use a selective adsorption step. FIG. 5 shows a representative embodiment of this type, using an upstream treatment step. Referring to this figure, stream 501, passes as feed to ancillary treatment unit, 502, adapted to perform any desired treatment of the raw gas, including dehydration, removal of heavy hydrocarbon liquid, and removal of other contaminants. The step results in a stream 503, which is withdrawn. Choices of treatment, stream compositions and disposition are as discussed above with respect to FIG. 3. The remainder of the stream passes on as stream 504 to the membrane separation step or unit, 505. In the case of compression/condensation, stream 504 is now saturated with hydrocarbons under the prevailing pressure and temperature conditions. Even though the stream is saturated, however, it can be passed safely to the membrane conditioning step, because the membranes used are able to handle such streams.

As before, the membrane unit contains a membrane that exhibits selectivity in favor of $C_{5+}$ hydrocarbons over hydrogen, and all the issues, considerations, choices and preferences discussed above with regard to the membrane separation step of FIG. 1 apply equally to this embodiment. The $C_{5+}$ hydrocarbons permeate the membrane and are removed as $C_{5+}$ hydrocarbons concentrated stream 506. The remaining gas is withdrawn from the feed side of the unit as residue stream 507, and passes to the membrane hydrogen/methane separation step, 508, which may be carried out in any convenient manner, such as described in relation to FIG. 4 above. The purified hydrogen product stream, 509, is withdrawn for use as desired, and the light hydrocarbon fuel gas stream is withdrawn as stream 510.

When the ancillary treatment step is compression/condensation, the scheme shown in FIG. 5 will produce two $C_{5+}$ hydrocarbon streams, liquid stream 503 and permeate vapor stream 506. It is preferred to return permeate vapor stream 506 to the inlet of the compression/condensation step, so that all of the $C_{5+}$ hydrocarbon is recovered in stream 503.

The invention is now further described by the following examples, which are intended to be illustrative of the invention, but are not intended to limit the scope or underlying principles in any way.

EXAMPLE 1

Calculations were performed to show the effect of compressing a low-pressure fuel gas stream to facilitate hydrogen recovery. The stream was assumed to be at a pressure of 50 psia and to have the following volume composition:

| Component | Content (vol %) |
|---|---|
| Hydrogen | 80 |
| $C_1$ hydrocarbons | 10 |
| $C_2$ hydrocarbons | 5 |
| $C_3$ hydrocarbons | 2 |
| $C_4$ hydrocarbons | 1.5 |

-continued

| Component | Content (vol %) | |
|---|---|---|
| $C_5$ hydrocarbons | 0.5 | $C_5$–$C_8$ hydrocarbons content = |
| $C_6$ hydrocarbons | 0.4 | 1.5% |
| $C_7$ hydrocarbons | 0.3 | |
| $C_8$ hydrocarbons | 0.3 | |

The dewpoint of such a stream at 50 psia is 21° C. It was then assumed that the stream was compressed to 200 psia. This raises the dewpoint to 48° C.

A computer calculation was performed to model a membrane conditioning step applied to the treatment of this stream to reduce the dewpoint. The calculation was performed using a modeling program, ChemCad III (ChemStations, Inc., Houston, Tex.), modified by in-house membrane separation modeling programs. The membrane used for the conditioning was assumed to be a silicone rubber membrane providing the following pressure-normalized fluxes:

| | |
|---|---|
| Hydrogen | $100 \times 10^{-6}$ cm$^3$(STP)/cm$^2$ · sec · cmHg |
| Methane | $140 \times 10^{-6}$ cm$^3$(STP)/cm$^2$ · sec · cmHg |
| Ethane | $350 \times 10^{-6}$ cm$^3$(STP)/cm$^2$ · sec · cmHg |
| Propane | $600 \times 10^{-6}$ cm$^3$(STP)/cm$^2$ · sec · cmHg |
| I-Butane | $1,400 \times 10^{-6}$ cm$^3$(STP)/cm$^2$ · sec · cmHg |
| n-Pentane | $2,000 \times 10^{-6}$ cm$^3$(STP)/cm$^2$ · sec · cmHg |
| n-Hexane | $2,500 \times 10^{-6}$ cm$^3$(STP)/cm$^2$ · sec · cmHg |
| n-Heptane | $3,000 \times 10^{-6}$ cm$^3$(STP)/cm$^2$ · sec · cmHg |
| n-Octane | $3,000 \times 10^{-6}$ cm$^3$(STP)/cm$^2$ · sec · cmHg |

The results of the calculations are shown in Table 1. The stream numbers correspond to FIG. 1.

TABLE 1

| Stream | 101 | 104 | 103 |
|---|---|---|---|
| Flow (scfm) | 100 | 75 | 25 |
| Mass flow (lb/h) | 131 | 67 | 64 |
| Temp. (°C.) | 47.8 | 47 | 47 |
| Pressure (psia) | 200 | 200 | 20 |
| Component (mol %): | | | |
| Hydrogen | 800 | 85.0 | 64.65 |
| Methane | 100 | 982 | 10.57 |
| Ethane | 5.0 | 3.46 | 9.72 |
| Propane | 2.0 | 1.02 | 5.02 |
| I-Butane | 1.5 | 0.42 | 4.81 |
| n-Pentane | 0.5 | 0.11 | 1.70 |
| n-Hexane | 0.4 | 0.08 | 1.39 |
| n-Heptane | 0.3 | 0.05 | 1.06 |
| n-Octane | 0.3 | 0.05 | 1.08 |

The conditioned stream, 104, has a total $C_5$–$C_8$ hydrocarbon content of only 0.29%, and was calculated to have a dewpoint of 12° C. The $C_5$–$C_8$ hydrocarbon flow in the conditioned stream is 0.21 scfm, compared with 1.5 scfm in the feed. This represents a $C_5$–$C_8$ hydrocarbon removal of 86%. The hydrogen loss into the permeate in this case is about 20%.

The conditioned stream is suitable for passing into the selective adsorption step, 105.

EXAMPLE 2

The calculations of Example 1 were repeated, this time assuming that the feed stream is cooled to 25° C. before passing it into the conditioning membrane unit, according to the scheme of FIG. 3. The ancillary treatment step, box 302, now represents simple air or water cooling, and box 305 represents the membrane conditioning step. Cooling to 25° C. condenses a portion of the feed stream, represented by stream 303, leaving an uncondensed portion, 304, which is at 200 psia and 25° C., and saturated with hydrocarbons. The membrane conditioning step was again assumed to be carried out using a silicone rubber membrane providing the same permeation properties as in Example 1. The results of the calculations are shown in Table 2, where stream numbers correspond to FIG. 3.

TABLE 2

| Stream | 301 | 304 | 303 | 307 | 306 |
|---|---|---|---|---|---|
| Flow (scfm) | 100 | 99 | 1 | 76 | 23 |
| Mass flow (lb/h) | 131 | 121 | 10 | 66 | 55 |
| Temp. (°C.) | 170 | 25 | 25 | 24 | 24 |
| Pressure (psia) | 200 | 200 | 200 | 200 | 20 |
| Component (mol %): | | | | | |
| Hydrogen | 80.0 | 80.5 | 0.84 | 85.0 | 66.0 |
| Methane | 10.0 | 10.0 | 0.75 | 9.83 | 17.79 |
| Ethane | 5.0 | 5.0 | 2.12 | 3.50 | 9.92 |
| Propane | 2.0 | 2.0 | 2.99 | 1.03 | 5.1 |
| I-Butane | 1.5 | 1.47 | 5.41 | 0.43 | 4.83 |
| n-Pentane | 0.5 | 0.45 | 8.09 | 0.10 | 1.57 |
| n-Hexane | 0.4 | 0.29 | 16.98 | 0.06 | 1.05 |
| n-Heptane | 0.3 | 0.14 | 25.71 | 0.02 | 0.49 |
| n-Octane | 0.3 | 0.06 | 37.11 | 0.01 | 0.23 |

In this case, the conditioned membrane residue stream, 307, has a $C_5$–$C_8$ hydrocarbon content of 0.19% and a calculated dewpoint of –5° C. The removal of $C_5$–$C_8$ hydrocarbons by the conditioning is 91% and the combined hydrogen loss into the condensate stream and the permeate stream is about 19%. The conditioned stream would again be suitable for treatment by a selective adsorption step.

EXAMPLES 3–7

A set of calculations was performed to show the effect of membrane stage-cut (the percentage of the feed gas permeating the membrane). The feed stream was assumed to be at a pressure of 200 psia, at its dewpoint temperature of 10° C., and to have the following composition:

| Component | Content (vol %) | |
|---|---|---|
| Hydrogen | 80.8 | |
| $C_1$ hydrocarbons | 10.0 | |
| $C_2$ hydrocarbons | 5.0 | |
| $C_3$ hydrocarbons | 2.0 | |
| $C_4$ hydrocarbons | 1.4 | |
| $C_5$ hydrocarbons | 0.38 | $C_5$–$C_8$ hydrocarbons content = |
| $C_6$ hydrocarbons | 0.18 | 0.64% |
| $C_7$ hydrocarbons | 0.06 | |
| $C_8$ hydrocarbons | 0.02 | |

The membrane and its properties were assumed to be as in Example 1.

EXAMPLE 3

The calculations were performed assuming an 11% stage cut provided by a membrane area of 4.5 m². The results of the calculations are shown in Table 3. The stream numbers correspond to FIG. 1.

TABLE 3

| Stream | 101 | 104 | 103 |
|---|---|---|---|
| Flow (scfm) | 100 | 88 | 11 |
| Mass flow (lb/h) | 115 | 88 | 28 |
| Temp. (°C.) | 10 | 10 | 10 |
| Pressure (psia) | 200 | 200 | 20 |
| Component (mol %): | | | |
| Hydrogen | 80.8 | 83.0 | 63.75 |
| Methane | 10.1 | 10.03 | 10.64 |
| Ethane | 5.0 | 4.31 | 10.65 |
| Propane | 2.0 | 1.49 | 5.81 |
| I-Butane | 1.4 | 0.84 | 6.07 |
| n-Pentane | 0.38 | 0.20 | 1.78 |
| n-Hexane | 0.18 | 0.09 | 0.91 |
| n-Heptane | 0.06 | 0.03 | 0.29 |
| n-Octane | 0.02 | 0.01 | 0.10 |

EXAMPLE 4

The calculations were repeated, assuming a stage-cut of 17%, provided by a membrane area of 6.5 m². The results of the calculations are shown in Table 4. The stream numbers correspond to FIG. 1.

TABLE 4

| Stream | 101 | 104 | 103 |
|---|---|---|---|
| Flow (scfm) | 100 | 82 | 17 |
| Mass flow (lb/h) | 115 | 77 | 39 |
| Temp. (°C.) | 10 | 9.4 | 9.4 |
| Pressure (psia) | 200 | 200 | 200 |
| Component (mol %): | | | |
| Hydrogen | 80.8 | 84.0 | 95.29 |
| Methane | 10.1 | 9.96 | 10.79 |
| Ethane | 5.0 | 3.94 | 10.37 |
| Propane | 2.0 | 1.26 | 5.48 |
| I-Butane | 1.4 | 0.62 | 5.40 |
| n-Pentane | 0.38 | 0.14 | 1.55 |
| n-Hexane | 0.18 | 0.06 | 0.78 |
| n-Heptane | 0.06 | 0.02 | 0.25 |
| n-Octane | 0.02 | 0.01 | 0.08 |

EXAMPLE 5

The calculations were repeated, assuming a stage-cut of 23%, provided by a membrane area of 9 m². The results of the calculations are shown in Table 5. The stream numbers correspond to FIG. 1.

TABLE 5

| Stream | 101 | 104 | 103 |
|---|---|---|---|
| Flow (scfm) | 100 | 76 | 23 |
| Mass flow (lb/h) | 115 | 66 | 50 |
| Temp. (°C.) | 10 | 9 | 9 |
| Pressure (psia) | 200 | 200 | 20 |
| Component (mol %): | | | |
| Hydrogen | 80.8 | 85.02 | 66.86 |
| Methane | 10.1 | 9.85 | 10.93 |
| Ethane | 5.0 | 3.52 | 10.04 |
| Propane | 2.0 | 1.04 | 5.12 |
| I-Butane | 1.4 | 0.43 | 4.76 |
| n-Pentane | 0.38 | 0.09 | 1.34 |
| n-Hexane | 0.18 | 0.04 | 0.67 |

TABLE 5-continued

| Stream | 101 | 104 | 103 |
|---|---|---|---|
| n-Heptane | 0.06 | 0.01 | 0.21 |
| n-Octane | 0.02 | --- | 0.07 |

--- = less than 0.01

EXAMPLE 6

The calculations were repeated, assuming a stage-cut of 29%, provided by a membrane area of 12 m². The results of the calculations are shown in Table 6. The stream numbers correspond to FIG. 1.

TABLE 6

| Stream | 101 | 104 | 103 |
|---|---|---|---|
| Flow (scfm) | 100 | 70 | 29 |
| Mass flow (lb/h) | 115 | 56 | 59 |
| Temp. (°C.) | 10 | 9 | 9 |
| Pressure (psia) | 200 | 200 | 20 |
| Component (mol %): | | | |
| Hydrogen | 80.8 | 85.99 | 68.38 |
| Methane | 10.1 | 9.70 | 11.04 |
| Ethane | 5.0 | 3.10 | 9.67 |
| Propane | 2.0 | 0.83 | 4.75 |
| I-Butane | 1.4 | 0.29 | 4.19 |
| n-Pentane | 0.38 | 0.06 | 1.16 |
| n-Hexane | 0.18 | 0.02 | 0.57 |
| n-Heptane | 0.06 | 0.01 | 0.18 |
| n-Octane | 0.02 | --- | 0.06 |

--- = less than 0.01

EXAMPLE 7

Comparison of Examples 3–6

The calculations of Examples 3–6 were compared. Key differences are summarized in Table 7.

TABLE 7

| Example No. | Membrane Area (m2) | Dewpoint (°C.) | Hydrogen Loss (%) | Hydrogen in Residue (%) | Δ Dewpoint (°C.) |
|---|---|---|---|---|---|
| — | 0 | 10.0 | 0 | 80.8 | 0 |
| 3 | 4.5 | −2.6 | 8.9 | 83.0 | 12.6 |
| 4 | 65 | −9.1 | 13.6 | 84.0 | 19.1 |
| 5 | 9 | −16.5 | 19.1 | 85.0 | 26.5 |
| 6 | 12 | −24.1 | 24.5 | 86.0 | 34.1 |

As can be seen, there is a tradeoff as expected between dewpoint lowering and hydrogen loss. However, very low dewpoints can be reached if required with very modest membrane areas. The lower the dewpoint, the higher is the level of conditioning and the easier is the subsequent selective adsorption step.

EXAMPLES 8–9

A set of calculations was performed to evaluate the effect if gas streams containing $C_{5-C8}$ hydrocarbons are introduced into hydrogen-selective membrane separation units. For the calculations, the same gas stream was assumed as in Examples 3–7, that is, a stream at a pressure of 200 psia, having a dewpoint temperature at 200 psia of 10° C., and having the following composition:

| Component | Content (vol %) | |
|---|---|---|
| Hydrogen | 80.8 | |
| $C_1$ hydrocarbons | 10.0 | |
| $C_2$ hydrocarbons | 5.0 | |
| $C_3$ hydrocarbons | 2.0 | |
| $C_4$ hydrocarbons | 1.4 | |
| $C_5$ hydrocarbons | 0.38 | $C_5$–$C_8$ hydrocarbons content = |
| $C_6$ hydrocarbons | 0.18 | 0.64% |
| $C_7$ hydrocarbons | 0.06 | |
| $C_8$ hydrocarbons | 0.02 | |

EXAMPLE 8

(not in accordance with the invention)

The gas was assumed to be introduced at 35° C. into a system containing hydrogen-selective membranes, as shown by box 405 in FIG. 4. For the purposes of this comparative calculation, the conditioning step, box 402, was assumed to be absent. The hydrogen-selective membranes were assumed to provide the following transmembrane fluxes:

| Hydrogen | $100 \times 10^{-6}$ cm³(STP)/cm² · sec · cmHg |
|---|---|
| Methane | $1 \times 10^{-6}$ cm³(STP)/cm² · sec · cmHg |
| Ethane | $0.5 \times 10^{-6}$ cm³(STP)/cm² · sec · cmHg |
| Propane | $0.3 \times 10^{-6}$ cm³(STP)/cm² · sec · cmHg |
| I-Butane | $0.2 \times 10^{-6}$ cm³(STP)/cm² · sec · cmHg |
| n-Pentane | $0.2 \times 10^{-6}$ cm³(STP)/cm² · sec · cmHg |
| n-Hexane | $0.2 \times 10^{-6}$ cm³(STP)/cm² · sec · cmHg |
| n-Heptane | $0.1 \times 10^{-6}$ cm³(STP)/cm² · sec · cmHg |
| n-Octane | $0.1 \times 10^{-6}$ cm³(STP)/cm² · sec · cmHg |

The results of the calculations are shown in Table 8. The stream numbers correspond to FIG. 4.

TABLE 8

| Stream | 404 | 407 | 406 |
|---|---|---|---|
| Flow (scfm) | 100 | 27 | 72 |
| Mass flow (lb/h) | 115 | 90 | 26 |
| Temp. (°C.) | 35 | 37 | 37 |
| Pressure (psia) | 200 | 200 | 20 |
| Component (mol %): | | | |
| Hydrogen | 80.8 | 30.00 | 99.5 |
| Methane | 10.0 | 36.60 | 0.39 |
| Ethane | 5.0 | 18.47 | 0.10 |
| Propane | 2.0 | 7.29 | 0.03 |
| I-Butane | 1.4 | 5.28 | 0.02 |
| n-Pentane | 0.38 | 1.40 | --- |
| n-Hexane | 0.18 | 0.68 | --- |
| n-Heptane | 0.06 | 0.21 | --- |
| n-Octane | 0.02 | 0.07 | --- |

--- = less than 0.01

As hydrogen is selectively withdrawn into the permeate stream, the residue stream hydrocarbon content increases substantially. As can be seen, the residue stream as it exits the modules has a $C_5$–$C_8$ hydrocarbon content of 2.36% and a total hydrocarbon content of 70%. This stream has a dewpoint of 37° C. at 200 psia. Thus, even operating the membrane separation step at 35° C., as was assumed, is not sufficient to protect the unit from condensation of liquid hydrocarbons on the membrane surface. To be sure of avoiding such condensation, the feed stream would have to be heated to 40° C. or above.

EXAMPLE 9

The calculations were repeated, this time assuming that the feed stream is first conditioned by membrane conditioning step 402. The membranes used for the conditioning step were assumed to be silicone rubber membranes providing transmembrane fluxes as in Example 1. In this case, the gas was assumed to be introduced into the membrane unit at 10° C. The results of the calculations are shown in Table 9. The stream numbers correspond to FIG. 4.

TABLE 9

| Stream | 401 | 403 | 404 | 407 | 406 |
|---|---|---|---|---|---|
| Flow (scfm) | 100 | 23 | 76 | 16 | 60 |
| Mass flow (lb/h) | 115 | 50 | 66 | 45 | 21 |
| Temp. (°C.) | 10 | 9 | 10 | 11 | 11 |
| Pressure (psia) | 200 | 20 | 200 | 200 | 20 |
| Component (mol %): | | | | | |
| Hydrogen | 80.8 | 66.7 | 85.02 | 30.00 | 99.51 |
| Methane | 10.0 | 10.93 | 9.85 | 45.76 | 0.39 |
| Ethane | 5.0 | 10.04 | 3.52 | 16.62 | 0.07 |
| Propane | 2.0 | 5.12 | 1.04 | 4.90 | 0.02 |
| I-Butane | 1.4 | 4.76 | 0.43 | 2.05 | 0.01 |
| n-Pentane | 0.38 | 1.14 | 0.09 | 0.43 | --- |
| n-Hexane | 0.18 | 0.67 | 0.04 | 0.18 | --- |
| n-Heptane | 0.06 | 0.21 | 0.01 | 0.05 | --- |
| n-Octane | 0 | 02 | 0.07 | --- | 0.02 | 0.0 |

--- = less than 0.01

By conditioning the gas stream, the dewpoint is lowered to −17° C., a reduction of 27° C. As the gas passes through the hydrogen-selective membrane modules, the residue stream $C_5$–$C_8$ hydrocarbon concentration rises to only 0.7% and the total hydrocarbon content to 70%. This stream is much lighter than the previous residue stream in Example 8, and has a dewpoint of 9° C. Although this represents a dewpoint temperature increase of 25° C. compared with the feed, stream 404, to these modules, it is just below the operating temperature of the system, so no condensation will occur. Obviously, operating at a few degrees higher would be safer in a real system.

EXAMPLE 10–11

A set of calculations was performed to illustrate the effect of the conditioning treatment on a fuel gas stream with a hydrogen content of 45% and a $C_5$–$C_8$ hydrocarbon content of 5%. The full gas composition was assumed to be as follows:

| Component | Content (vol %) | |
|---|---|---|
| Hydrogen | 45 | |
| $C_1$ hydrocarbons | 25 | |
| $C_2$ hydrocarbons | 12 | |
| $C_3$ hydrocarbons | 10 | |
| $C_4$ hydrocarbons | 3.0 | |
| $C_5$ hydrocarbons | 2.5 | $C_5$–$C_8$ hydrocarbons content = 5% |
| $C_6$ hydrocarbons | 1.0 | |
| $C_7$ hydrocarbons | 1.0 | |
| $C_8$ hydrocarbons | 0.5 | |

This gas has a dewpoint at 200 psia of 68° C. The gas was assumed to be at 200 psia and to be subjected to treatment as in FIG. 5, by cooling to 25° C. in step 502, then passing to a membrane unit, 505, containing silicone rubber membranes with permeation properties as in Example 1. Finally, the hydrogen/methane separation was assumed to be carried out using a conventional hydrogen-selective membrane having permeation properties as in Examples 8–9.

EXAMPLE 10

(not in accordance with the invention)

For this calculation, it was assumed that the membrane conditioning step is absent; that is, the gas is simply cooled to 25° C., then passed into the hydrogen/methane separation membranes. The results of the calculations are shown in Table 10. The stream numbers correspond to FIG. 5.

TABLE 11

| Stream | 501 | 504 | 503 | 506 | 507 | 510 | 509 |
|---|---|---|---|---|---|---|---|
| Flow (scfm) | 100 | 95 | 5 | 11 | 85 | 60 | 25 |
| Mass flow (lb./h) | 316 | 259 | 57 | 54 | 205 | 195 | 10 |
| Temp. (°C.) | 50 | 25 | 25 | 24 | 25 | 26 | 26 |
| Pressure (psia) | 200 | 200 | 200 | 20 | 200 | 200 | 20 |
| Component (mol %): | | | | | | | |
| Hydrogen | 45.0 | 47.11 | 0.56 | 24.08 | 50.02 | 30.01 | 98.56 |
| Methane | 25.0 | 26.09 | 2.02 | 18.11 | 27.10 | 37.84 | 1.05 |
| Ethane | 12.0 | 12.33 | 5.11 | 18.47 | 11.55 | 16.22 | 0.22 |
| Propane | 10.0 | 9.81 | 13.94 | 21.65 | 8.32 | 11.69 | 0.13 |
| I-Butane | 3.0 | 2.71 | 9.18 | 9.55 | 1.84 | 2.59 | 0.03 |
| n-Pentane | 2.5 | 1.50 | 23.67 | 6.09 | 0.92 | 1.29 | 0.01 |
| n-Hexane | 1.0 | 0.31 | 15.49 | 1.37 | 0.18 | 0.25 | --- |
| n-Heptane | 1.0 | 0.12 | 19.46 | 0.57 | 0.07 | 0.10 | --- |
| n-Octane | 0.5 | 0.02 | 10.58 | 0.11 | 0.01 | 0.02 | --- |

--- = less than 0.01

After cooling to 25° C., the stream obviously has a dewpoint of 25° C. Passage of this saturated stream through the hydrogen-selective membrane modules raises the dewpoint to 32° C. Thus, the stream would have to be heated above this temperature to avoid membrane damage by hydrocarbon condensation.

EXAMPLE 11

The calculation of Example 10 was repeated, including the silicone rubber membrane conditioning step as in FIG. 5. The results of the calculations are shown in Table 11. The stream numbers correspond to FIG. 5.

TABLE 10

| Stream | 501 | 507 | 503 | 510 | 509 |
|---|---|---|---|---|---|
| Flow (scfm) | 100 | 95 | 5 | 71 | 24 |
| Mass flow (lb/h) | 316 | 259 | 57 | 250 | 9 |
| Temp. (°C.) | 70 | 25 | 25 | 27 | 27 |
| Pressure (psia) | 200 | 200 | 200 | 200 | 20 |
| Component (mol %): | | | | | |
| Hydrogen | 45.0 | 47.11 | 0.56 | 30.00 | 98.51 |
| Methane | 25.0 | 26.09 | 2.02 | 34.43 | 1.03 |
| Ethane | 12.0 | 12.33 | 5.11 | 16.35 | 0.24 |
| Propane | 10.0 | 9.81 | 13.94 | 13.03 | 0.16 |
| I-Butane | 3.0 | 2.71 | 9.18 | 3.59 | 0.04 |
| n-Pentane | 2.5 | 1.50 | 23.67 | 2.00 | 0.01 |
| n-Hexane | 1.0 | 0.31 | 15.49 | 0.42 | --- |
| n-Heptane | 1.0 | 0.12 | 19.46 | 0.17 | --- |
| n-Octane | 0.5 | 0.02 | 10.58 | 0.03 | --- |

--- = less than 0.01

The membrane conditioning step reduces the dewpoint to 14° C. In this case, passage through the hydrogen/methane separation membrane unit raises the dewpoint of the residue gas to 21° C. Since this is below the operating temperature of the membrane unit, no condensation will occur.

EXAMPLES 12–13

A set of calculations was performed, based on the same assumptions as for Examples 10–11, but this time assuming a fuel gas stream with a hydrogen content of only 20%, a propane content of 40%, and a $C_5$–$C_8$ hydrocarbon content of 4%. The full gas composition was assumed to be as follows:

| Component | Content (vol %) | |
|---|---|---|
| Hydrogen | 20 | |
| $C_1$ hydrocarbons | 15 | |
| $C_2$ hydrocarbons | 15 | |
| $C_3$ hydrocarbons | 40 | |
| $C_4$ hydrocarbons | 6.0 | |
| $C_5$ hydrocarbons | 2.0 | $C_5$–$C_8$ hydrocarbons content = 4% |
| $C_6$ hydrocarbons | 1.0 | |
| $C_7$ hydrocarbons | 0.5 | |
| $C_8$ hydrocarbons | 0.5 | |

The gas was assumed to be at 200 psia and to be subjected to treatment as in FIG. 5, by cooling to 25° C. in step 502, then passing to a membrane unit, 505, containing silicone rubber membranes with permeation properties as in Example 1. Finally, the hydrogen/methane separation was assumed to be carried out using a conventional hydrogen-selective membrane having permeation properties as in Examples 8–9.

EXAMPLE 12

(not in accordance with the invention)

For this calculation, it was assumed that the membrane conditioning step is absent; that is, the gas is simply cooled to 25° C., then passed into the hydrogen/methane separation membranes. The results of the calculations are shown in Table 12. The stream numbers correspond to FIG. 5.

TABLE 12

| Stream | 501 | 507 | 503 | 510 | 509 |
|---|---|---|---|---|---|
| Flow (scfm) | 100 | 87 | 13 | 74 | 14 |
| Mass flow (lb/h) | 532 | 415 | 117 | 406 | 10 |
| Temp. (°C.) | 50 | 25 | 25 | 28 | 28 |
| Pressure (psia) | 200 | 200 | 200 | 200 | 20 |
| Component (mol %): | | | | | |
| Hydrogen | 20.0 | 22.84 | 0.38 | 10.00 | 92.54 |
| Methane | 15.0 | 16.96 | 1.49 | 19.54 | 2.94 |
| Ethane | 15.0 | 16.18 | 6.84 | 18.90 | 1.43 |
| Propane | 40.0 | 38.29 | 51.83 | 44.84 | 2.71 |
| I-Butane | 6.0 | 4.74 | 14.72 | 5.55 | 0.34 |
| n-Pentane | 2.0 | 0.78 | 10.40 | 0.92 | 0.03 |
| n-Hexane | 1.0 | 0.17 | 6.73 | 0.20 | 0.01 |
| n-Heptane | 0.5 | 0.03 | 3.73 | 0.04 | --- |
| n-Octane | 0.5 | 0.01 | 3.88 | 0.01 | --- |

--- = less than 0.01

EXAMPLE 13

The calculation of Example 12 was repeated, including the silicone rubber membrane conditioning step as in FIG. 5. The results of the calculations are shown in Table 13. The stream numbers correspond to FIG. 5.

TABLE 13

| Stream | 501 | 504 | 503 | 506 | 507 | 510 | 509 |
|---|---|---|---|---|---|---|---|
| Flow (scfm) | 100 | 87 | 13 | 15 | 73 | 59 | 14 |
| Mass flow (lb/h) | 532 | 415 | 117 | 97 | 319 | 310 | 9 |
| Temp. (°C.) | 50 | 25 | 25 | 22 | 25 | 27 | 27 |

TABLE 13-continued

| Stream | 501 | 504 | 503 | 506 | 507 | 510 | 509 |
|---|---|---|---|---|---|---|---|
| Pressure (psia) | 200 | 200 | 200 | 20 | 200 | 200 | 20 |
| Component (mol %): | | | | | | | |
| Hydrogen | 20.0 | 22.84 | 0.38 | 7.05 | 26.01 | 10.00 | 93.41 |
| Methane | 15.0 | 16.96 | 1.49 | 7.17 | 18.92 | 22.73 | 2.90 |
| Ethane | 15.0 | 16.18 | 6.84 | 15.37 | 16.34 | 19.92 | 1.28 |
| Propane | 40.0 | 38.29 | 51.83 | 55.56 | 34.82 | 42.57 | 2.18 |
| I-Butane | 6.0 | 4.74 | 14.72 | 11.82 | 3.31 | 4.05 | 0.21 |
| n-Pentane | 2.0 | 0.78 | 10.40 | 2.32 | 0.47 | 0.58 | 0.02 |
| n-Hexane | 1.0 | 0.17 | 6.73 | 0.56 | 0.09 | 0.11 | --- |
| n-Heptane | 0.5 | 0.03 | 3.73 | 0.11 | 0.02 | 0.02 | --- |
| n-Octane | 0.5 | 0.01 | 3.88 | 0.04 | 0.01 | 0.01 | --- |

--- = less than 0.01

EXAMPLE 14

The effect on the dewpoint of a gas of the weight of the individual hydrocarbons that it contains was calculated. The first gas composition was assumed to be as follows:

| Component | Content (vol %) |
|---|---|
| Hydrogen | 80.8 |
| $C_1$ hydrocarbons | 11.0 |
| $C_2$ hydrocarbons | 5.0 |
| $C_3$ hydrocarbons | 2.0 |
| $C_4$ hydrocarbons | 1.4 |
| $C_5$ hydrocarbons | 0.38 |
| $C_6$ hydrocarbons | 0.18 |
| $C_7$ hydrocarbons | 0.06 |
| $C_8$ hydrocarbons | 0.02 |

This gas has a dewpoint at 200 psia of 10° C. The gas dewpoint was recalculated, first assuming that all the $C_8$ hydrocarbon had been removed, then all the $C_7$ and $C_8$ hydrocarbons, then all the $C_6$, $C_7$ and $C_8$, and so on. The calculations are summarized in Table 14.

TABLE 14

| Hydrocarbon | Hydrocarbon Removed (%) | Total Hydrocarbon Removed (%) | New Dewpoint (°C.) | Total Δ Dewpoint (°C.) |
|---|---|---|---|---|
| Octane | 0.02 | 0.02 | 3.0 | 7.0 |
| Heptane | 0.06 | 0.08 | −6.8 | 16.8 |
| Hexane | 0.18 | 0.26 | −22.8 | 32.8 |
| Pentane | 0.38 | 0.64 | −42.6 | 52.6 |

The Table shows the disproportionate effect of the heavier hydrocarbons on gas dewpoint. By removing as little as 0.64% of the feed stream in the form of $C_5$–$C_8$ hydrocarbons, the dewpoint of the gas is changed by almost 53° C.

We claim:

1. A process for treating a gas containing at least hydrogen, methane and a $C_5$–$C_8$ hydrocarbon and having a first dewpoint of at least 10° C. at 200 psia, said process comprising a membrane conditioning step and a hydrogen/methane separation step;

wherein the membrane conditioning step comprises removing at least a portion of the $C_5$–$C_8$ hydrocarbon from the gas by:

(i) passing the gas as a feed stream across the feed side of a polymeric membrane having a feed side and permeate side, and being selective for the $C_5$–$C_8$ hydrocarbon over hydrogen;

(ii) withdrawing from the permeate side a permeate stream enriched in $C_5$–$C_8$ hydrocarbon compared with the gas;

(iii) withdrawing from the feed side a conditioned residue stream comprising hydrogen and methane and having a second dewpoint at 200 psia at least about 10° C. lower than the first dewpoint;

and wherein the hydrogen/methane separation step comprises:

(i) passing the conditioned residue stream to a selective adsorption system, thereby selectively adsorbing methane from the gas;

(ii) withdrawing a purified hydrogen product stream from the adsorption system;

(iii) desorbing and withdrawing a waste gas stream from the adsorption system.

2. The process of claim 1, wherein the selective adsorption step is pressure-swing adsorption.

3. The process of claim 1, wherein the membrane conditioning step is carried out using a silicone rubber membrane.

4. The process of claim 1, wherein the membrane conditioning step is carried out using a superglassy membrane.

5. The process of claim 1, wherein the membrane conditioning step is carried out using a polyamide-polyether block copolymer membrane.

6. The process of claim 1, wherein the gas is an off-gas from a hydrotreater.

7. The process of claim 1, wherein the gas is an off-gas from a hydrocracker.

8. The process of claim 1, wherein the gas is an off-gas from a catalytic reformer.

9. The process of claim 1, wherein the gas is an off-gas from an isomerization process.

10. The process of claim 1, wherein the gas is an off-gas from a dealkylation process.

11. The process of claim 1, wherein the gas is an off-gas from a catalytic cracker.

12. The process of claim 1, wherein the gas is an off-gas from a coker.

13. The process of claim 1, wherein the waste gas stream is used as fuel.

14. The process of claim 1, further comprising passing the gas through an additional treatment step between the membrane conditioning step and the selective adsorption step.

15. The process of claim 1, further comprising passing the gas through an additional treatment step before the membrane conditioning step.

16. The process of claim 15, wherein the additional treatment step comprises compressing and cooling the gas, thereby condensing a liquid $C_5$–$C_8$ hydrocarbon fraction, which is removed from the gas prior to passing the gas across the feed side.

17. The process of claim 16, wherein the permeate stream is recirculated to the additional treatment step.

18. The process of claim 1, wherein the second dewpoint is at least about 20° C. lower than the first dewpoint.

19. The process of claim 1, wherein the second dewpoint is at least about 30° C. lower than the first dewpoint.

20. The process of claim 1, wherein the second dewpoint is at least about 40° C. lower than the first dewpoint.

21. The process of claim 1, wherein the membrane conditioning step removes at least about 80% of the $C_5$–$C_8$ hydrocarbon from the gas.

22. The process of claim 1, wherein the membrane conditioning step removes at least about 90% of the $C_5$–$C_8$ hydrocarbon from the gas.

23. A process for treating a gas containing at least hydrogen, methane and a $C_5$–$C_8$ hydrocarbon and having a first dewpoint of at least 10° C. at 200 psia, said process comprising a membrane conditioning step and a hydrogen/methane separation step;

wherein the membrane conditioning step comprises removing at least a portion of the $C_5$–$C_8$ hydrocarbon from the gas by:

(i) passing the gas as a feed stream across the feed side of a polymeric membrane having a feed side and permeate side, and being selective for the $C_5$–$C_8$ hydrocarbon over hydrogen;

(ii) withdrawing from the permeate side a permeate stream enriched in $C_5$–$C_8$ hydrocarbon compared with the gas;

(iii) withdrawing from the feed side a conditioned residue stream comprising hydrogen and methane and having a second dewpoint at 200 psia at least about 10° C. lower than the first dewpoint;

and wherein the hydrogen/methane separation step comprises a membrane separation step, comprising:

(i) passing the conditioned residue stream as a second feed stream across the second feed side of a second polymeric membrane having a second feed side and a second permeate side, and being selective for hydrogen over hydrocarbons;

ii) withdrawing from the second permeate side a purified hydrogen product stream;

(iii) withdrawing from the second feed side a residue waste gas stream enriched in methane and depleted in hydrogen compared with the conditioned gas.

24. The process of claim 23, wherein the membrane conditioning step is carried out using a silicone rubber membrane.

25. The process of claim 23, wherein the membrane conditioning step is carried out using a superglassy membrane.

26. The process of claim 23, wherein the membrane conditioning step is carried out using a polyamide-polyether block copolymer membrane.

27. The process of claim 23, wherein the second polymeric membrane has a selectivity for hydrogen over methane of at least about 10.

28. The process of claim 23, wherein the membrane separation step is carried out using a polyimide membrane.

29. The process of claim 23, wherein the gas is an off-gas from a hydrotreater.

30. The process of claim 23, wherein the gas is an off-gas from a hydrocracker.

31. The process of claim 23, wherein the gas is an off-gas from a catalytic reformer.

32. The process of claim 23, wherein the gas is an off-gas from an isomerization process.

33. The process of claim 23, wherein the gas is an off-gas from a dealkylation process.

34. The process of claim 23, wherein the gas is an off-gas from a catalytic cracker.

35. The process of claim 23, wherein the gas is an off-gas from a coker.

36. The process of claim 23, wherein the waste gas stream is used as fuel.

37. The process of claim 23, further comprising passing the gas through an additional treatment step between the membrane conditioning step and the membrane separation step.

38. The process of claim 23, further comprising passing the gas through an additional treatment step before the membrane conditioning step.

39. The process of claim 38, wherein the additional treatment step comprises compressing and cooling the gas, thereby condensing a liquid $C_5$–$C_8$ hydrocarbon fraction, which is removed from the gas prior to passing the gas across the feed side.

40. The process of claim 39, wherein the permeate stream is recirculated to the additional treatment step.

41. The process of claim 23, wherein the second dewpoint is at least about 20° C. lower than the first dewpoint.

42. The process of claim 23, wherein the second dewpoint is at least about 30° C. lower than the first dewpoint.

43. The process of claim 23, wherein the second dewpoint is at least about 40° C. lower than the first dewpoint.

44. The process of claim 23, wherein the membrane conditioning step removes at least about 80% of the $C_5$–$C_8$ hydrocarbon from the gas.

45. The process of claim 23, wherein the membrane conditioning step removes at least about 90% of the $C_5$–$C_8$ hydrocarbon from the gas.

* * * * *